United States Patent
Reisenfeld et al.

(10) Patent No.: US 11,782,118 B2
(45) Date of Patent: Oct. 10, 2023

(54) DIRECTION OF ARRIVAL ESTIMATION

(71) Applicant: MACQUARIE UNIVERSITY, New South Wales (AU)

(72) Inventors: Sam Reisenfeld, New South Wales (AU); Audri Biswas, New South Wales (AU)

(73) Assignee: MACQUARIE UNIVERSITY, New South Wales (AU)

( * ) Notice: Subject to any disclaimer, the term of this patent is extended or adjusted under 35 U.S.C. 154(b) by 0 days.

(21) Appl. No.: 17/509,543

(22) Filed: Oct. 25, 2021

(65) Prior Publication Data
US 2022/0113363 A1    Apr. 14, 2022

Related U.S. Application Data

(63) Continuation of application No. 16/345,225, filed as application No. PCT/AU2017/051189 on Oct. 27, 2017, now Pat. No. 11,194,005.

(30) Foreign Application Priority Data

Oct. 28, 2016   (AU) .............................. 2016904419
Nov. 14, 2016   (AU) .............................. 2016904636

(51) Int. Cl.
| | | |
|---|---|---|
| *G01S 3/04* | (2006.01) | |
| *G01S 3/48* | (2006.01) | |
| *G01S 3/72* | (2006.01) | |
| *G01S 3/80* | (2006.01) | |

(52) U.S. Cl.
CPC ............... *G01S 3/043* (2013.01); *G01S 3/48* (2013.01); *G01S 3/72* (2013.01); *G01S 3/8003* (2013.01)

(58) Field of Classification Search
CPC ... G01S 3/043; G01S 3/48; G01S 3/72; G01S 3/8003
USPC ........................... 342/61, 147, 194, 161, 154
See application file for complete search history.

(56) References Cited

U.S. PATENT DOCUMENTS

| | | | |
|---|---|---|---|
| 7,079,070 B2 * | 7/2006 | Kongelbeck | .......... F41G 7/2286 342/61 |
| 2011/0074633 A1 | 3/2011 | Pun et al. | |
| 2016/0071526 A1 | 3/2016 | Wingate et al. | |

FOREIGN PATENT DOCUMENTS

WO    WO2015/096099    7/2015

OTHER PUBLICATIONS

Klema et al., "The singular value decomposition: Its computation and some applications", IEEE Transactions on Automatic Control, vol. 25(2), pp. 164-176, 1980.

(Continued)

*Primary Examiner* — Bo Fan
(74) *Attorney, Agent, or Firm* — Haynes and Boone, LLP

(57) ABSTRACT

Iterative methods for direction of arrival estimation of a signal at a receiver with a plurality of spatially separated sensor elements are described. A quantized estimate of the angle of arrival is obtained from a compressive sensing solution of a set of equations. The estimate is refined in a subsequent iteration by a computed error based a quantized estimate of the direction of arrival in relation to quantization points offset from the quantization points for the first quantized estimate of the angle of arrival. The iterations converge on an estimated direction of arrival.

20 Claims, 8 Drawing Sheets

(56) References Cited

OTHER PUBLICATIONS

Schmidt, "Multiple emitter location and signal parameter estimation", IEEE Transactions on Antennas and Propagation, vol. 34(3), pp. 276-280, 1986.
Roy et al., "Esprit—estimation of signal parameters via rotational invariance techniques", IEEE Transactions on Acoustics, Speech, and Signal Processing, vol. 37(7), pp. 984-995, 1989.
Belloni et al., "Beamspace transform for UCA error analysis and bias reduction", IEEE Transactions on Signal Processing, vol. 54(8), pp. 3078-3089, Aug. 2006.
Sathish Chandran, "Advances in Direction of Arrival Estimation", Artech House, Boston, Boston, 2006.
Candes et al., "An introduction to compressive sampling", Signal Processing Magazine, IEEE, vol. 25(2), pp. 21-30, Mar. 2008.
Foutz et al., "Narrowband Direction of Arrival Estimation for Antenna Arrays", Morgan and Claypool Publishers, 2008.
T. Engin Tuncer et al., "Classical and Modern Direction-of-Arrival", Academic Press, Burlington, Massachusetts, 2009.
Wang et al., "Direction estimation using compressive sampling array processing", IEEE/SP 15th Workshop on Statistical Signal Processing, pp. 626-629, Aug. 2009.
Needell et al., "Iterative signal recovery from incomplete and inaccurate samples", Applied and Computational Harmonic Analysis, vol. 26(3), pp. 301-321, 2009.
Feng et al., "Multiple target localization using compressive sensing", In Global Telecommunications Conference, 2009. GLOBECOM 2009. IEEE, pp. 1-6, Nov. 2009.
Bellili et al., "On the lower performance bounds for DOA estimators from linearly-modulated signals", Communications (QBSC), 2010 25th Biennial Symposium on, pp. 381-386. IEEE, 2010.
Chen et al., "Direction-of-Arrival Estimation", Artech House, Boston, 2010.
Yang et al., "Effect of geometry of planar antenna arrays on Cramer-Rao Bounds for DOA Estimation", IEEE 10th International Conference on Signal Processing, 2010.
Bilik et al., "Spatial compressive sensing for direction-of-arrival estimation of multiple sources using dynamic sensor arrays", IEEE Transactions on Aerospace and Electronic Systems, vol. 47(3), pp. 1754-1769, 2011.
Davenport et al., "Introduction to compressed sensing", Preprint, vol. 93(1):2, 2011.
Carlin et al., Directions-of-arrival estimation through Bayesian compressive sensing strategies, IEEE Transactions on Antennas and Propagation, vol. 61(7), pp. 3828-3838, 2013.
Tan et al., "Sparse direction of arrival estimation using co-prime arrays with off-grid targets", IEEE Signal Processing Letters, vol. 21(1), pp. 26-29, 2014.
Ibrahim et al., "On the design of the measurement matrix for compressed sensing based DOA estimation", 2015 IEEE International Conference on Acoustics, Speech and Signal Processing (ICASSP), pp. 3631-3635. IEEE, 2015.
Barua et al., "A survey of Direction of Arrival estimation techniques and implementation of channel estimation based on SCME", 2015 12th International Conference on Electrical Engineering/Electronics, Computer, Telecommunications and Information Technology (ECTI-CON), Jun. 24-27, 2015.
Coutino et al., "Direction of arrival estimation based on information geometry", IEEE International Conference on Acoustics, Speech and Signal Processing (ICASSP), Mar. 2016.
Carlin et al., "Probabilistic direction of arrival estimation through Bayesian compressive sensing", The 8th European Conference on Antennas and Propagation (EuCAP 2014), pp. 359-362.
PCT Written Opinion of the International Searching Authority, PCT/AU2017/051189, dated Mar. 15, 2018, 7 pages.

* cited by examiner

DIRECTION OF ARRIVAL ESTIMATION

CROSS REFERENCE TO RELATED APPLICATIONS

The present application is a continuation of U.S. patent application Ser. No. 16/345,225, filed Apr. 25, 2019, which is a 371 of PCT/AU2017/051189, filed Oct. 27, 2017, which claims priority to Australian patent application 2016904419 filed 28 Oct. 2016 and Australian patent application 2016904636 filed 14 Nov. 2016, the entire contents of which are hereby incorporated by reference in their entirety.

FIELD

Embodiments of the present disclosure relate generally to the field of radio or sound transmission, in particular direction of arrival (DOA) estimation of radio or sound signals. Particular embodiments include a method for DOA estimation and a receiver configured for DOA estimation. Particular embodiments relate to DOA in mobile networks such as 4G and 5G networks, in Cognitive Radio Networks, in radio navigation, in indoor radio location, for example of items with transmitters, or in sonar or radar.

BACKGROUND

The Direction of Arrival (DOA) problem is critical to position location of one or more radio transmitters and arises across numerous applications in radio communications, radio navigation, object location and radar.

For example, in cellular 4G and 5G networks, a precise estimate of incoming DOA can facilitate operation of the network, for example through resource allocation to provide increased in-cell information capacity, such as through the use of small cells within the cell and direct device to device communication within the cell. Location information on radio transmitters is usable to achieve efficient resource allocation, for example to assist in maximising transmission capacity attained through the efficient designation of mobile users as device-to-device users, users transmitting and receiving through the base station, or small cell users transmitting through a radio head. In another example resources may be efficiently allocated to users when the location of the users is known. Resources that may be allocated include channels and transmit power levels.

In a Cognitive Radio Network, DOA may also be used for resource allocation. For example, the angular domain may be evenly sectorized into spatial slots. The dedicated spatial slots allow primary/licensed and secondary/unlicensed users to be spatially multiplexed simultaneously into the same channel. This results in an uninterrupted communication between users (primary/secondary), hence increasing the throughput of the overall network in a specific geographical region. In general, in Cognitive Radio Networks, knowledge of the position of radio transmitters is crucial for efficient networks operation.

In cellular networks as well as in CRN, when considering radio jamming, the determination of the DOA can be critical in producing a null in the received antenna pattern in the correct location to null-out the jammer. Determination of the location of radio jammers may also be important in defence networks. Further, the determination of the location of a radio transmitter may also be important for identifying whether a transmission originated from a legitimate user of the network or from a spoofer or unauthorized user of the network.

The DOA problem also arises in the context of determining the location of a source of sound. For example, DOA estimation may be required in relation to a sonar system.

In general, the determination of the location of a transmitter may be achieved by determining the angle of arrival at two receive locations and then using triangulation. For the case of the transmitter being colinear with the line between the two receiving stations, the angle of arrival from a third receiving station may be required.

The precision of the transmitter location increases with increasing precision of the angle of arrival. The minimization of error in the angle of arrival determination is therefore important, for at least some applications of the DOA problem.

Additionally, in at least some applications of the DOA problem there are limits on the computational capability and/or power consumption of the implementing device and/or it would be advantageous to provide a solution to the DOA problem that can be implemented on relatively low computationally capable platforms and/or with relatively low power consumption hardware or processors.

SUMMARY OF THE DISCLOSURE

The present disclosure generally relates to methods of direction of arrival (DOA) estimation of signals, including the example methods described in the paragraphs below.

A method for use in a direction of arrival estimator for a signal, includes:
  receiving, at a computational processor, a set of measurements of a signal taken by an array of sensor elements;
  generating first and second measures of a direction of arrival estimate, the generating based on first and second grids of potential direction of arrivals respectively, the first and second grids offset from each other;
  generating an angular discriminant based on the first and second measures; and
  generating third and fourth measures of a direction of arrival estimate, the generating based on third and fourth grids of potential direction of arrivals respectively, the third and fourth grids offset from the first and second measures by an amount based on the angular discriminant.

A method for use in a of direction of arrival estimation for a signal, includes:
  receiving, at a computational processor, a set of measurements of a signal from a source taken by an array of sensor elements;
  generating, by the computational processor based on the received measurements, a first measure associated with a first direction of arrival estimate for the signal, based on a first grid with a plurality of grid points corresponding to potential directions of arrival, the grid comprising a larger number of grid points than antenna elements in the array of sensor elements and a lower resolution of grid points than required to achieve a target accuracy for the direction of arrival estimation;
  generating, by the computational processor, a second measure associated with a second direction of arrival estimate for the signal, based on a second grid comprising grid points around the first direction of arrival estimate that are offset to grid points in the first grid; and
  determining, by the computational processor, an angular discriminant based on the first measure and the second measure, wherein the measures associated with the direction of arrival estimates are based on a solution to a sparse problem defined by the received set of measurements and the respective grid points.

A method of direction of arrival estimation for a signal includes:

receiving, at a computational processor, a set of measurements of a signal from a source taken by an array of sensor elements;

generating, by the computational processor based on the received measurements, a direction of arrival estimate for the signal, wherein the direction of arrival estimate is based on compressive sensing of a sparse problem defined by the received set of measurements and a grid with a plurality of grid points corresponding to potential directions of arrival, the grid comprising a larger number of grid points than sensor elements in the array of sensor elements.

A sensor array for direction of arrival estimation includes a plurality of sensor elements arranged in an array geometry, each sensor element configured to provide a measurement signal of a signal having a base wavelength, wherein a distance between pairs of sensor elements is substantially equal to a distance that minimises at least one of or a combined measure of a mutual coherence and a condition number of a matrix of said measurement signals of a signal by the sensor array at the base wavelength.

A sensor array for direction of arrival estimation includes a plurality of sensor elements arranged in an array geometry, each sensor element configured to provide a measurement signal of a signal having a base wavelength, wherein a distance between pairs of sensor elements is greater than a distance corresponding to one wavelength at the base wavelength.

A method comprising receiving, at a processor, input signals representative of detection of one or more signals received at respective plurality of spatially separated sensor elements:

in an first determination determining, by a processor, based on phase information in the input signals and a known geometry of the spatially separated sensor elements, a sparse solution indicating one or more estimated directions of arrival amongst a first set of candidate directions of arrival; and in a second determination, determining, by a processor, based on phase information in the input signals and the known geometry of the spatially separated sensor elements, a sparse solution indicating one or more estimated directions of arrival amongst a second set of candidate directions of arrival, wherein the second set of candidate directions of arrival is offset from the first set of candidate directions of arrival;

identifying, by a processor, an estimated direction of arrival, the estimated direction of arrival being offset from directions of arrival in the first and second sets by an amount determined based on a magnitude of the sparse solution for the first determination and a magnitude of the sparse solution for the second determination.

A method comprising receiving, at a processor, input signals representative of detection of one or more signals received at respective plurality of spatially separated sensor elements:

in an initial determination and in at least a first and a second iteration determining, by a processor, based on phase information in the input signals and a known geometry of the spatially separated sensor elements, a sparse solution indicating one or more estimated directions of arrival amongst a set of candidate directions of arrival, wherein for each iteration the set of candidate directions of arrival are rotated, the rotation selected based on preceding sparse solutions to cause the iterations to display convergence in the sparse solutions; and outputting data indicative of the solution for the second iteration or a subsequent iteration.

A method comprising receiving, at a processor, input signals representative of detection of one or more signals received at respective plurality of spatially separated sensor elements:

in an initial determination and in at least a first iteration determining, by a processor, based on phase information in the input signals and a known geometry of the spatially separated sensor elements, at least one sparse solution indicating one or more estimated directions of arrival amongst a set of candidate directions of arrival, wherein for each iteration the set of candidate directions of arrival are rotated, the rotation selected based on preceding sparse solutions to cause the iterations to display convergence in the sparse solutions; and outputting data indicative of the solution for the first iteration or a subsequent iteration.

A method for use in a of direction of arrival estimation for a signal, comprising:

receiving, at a processor, a set of measurements of a signal by an array of sensor elements;

generating, by a processor, a first plurality of measures of a direction of arrival estimate, the first plurality of measures related to first and second grids of candidate direction of arrivals respectively, the first and second grids offset from each other by a predetermined amount;

generating, by a processor, a first angular discriminant based on the first plurality of measures;

generating, by a processor, a second plurality of measures of a direction of arrival estimate, the second plurality of measures related to third and fourth grids of candidate direction of arrivals respectively, the third and fourth grids offset from the first and second grids by an amount determined by the angular discriminant; and generating, by a processor, a direction of arrival estimation based on a second angular discriminant based on the second plurality of measures.

A method for use in a of direction of arrival estimation for a signal, comprising:

receiving, at a processor, a set of measurements of a signal by an array of sensor elements;

iteratively generating, by a processor, a plurality of measures of a direction of arrival estimate, the plurality of measures related to first and second grids of candidate direction of arrivals respectively, the first and second grids offset from each other by a predetermined amount; and generating an angular discriminant for each iteration, wherein the first and second grids in a subsequent iteration are offset from the first and second grids in a current iteration by an amount determined by the angular discriminant for the current iteration;

generating a direction of arrival estimation based on the angular discriminant from at least one iteration.

In some embodiments, the predetermined amount is equal to a distance between two grid points in the first and second grids.

In some embodiments, the method further comprising generating, by a processor, an initial direction of arrival estimate identified from within a third grid of candidate direction of arrivals, the third grid centred with respect to the first and second grids, wherein the direction of arrival estimation is based on the initial direction of arrival estimate.

A method comprising receiving, at a processor, input signals representative of detection a signal received at a plurality of spatially separated sensor elements:

determining, by a processor, a plurality of sparse solutions for $\hat{S}_t$ in $V_n = \Phi(\Theta_t)\hat{S}_t$; and generating, by a processor an estimated direction of arrival of the signal received at the sensor elements, wherein the estimated direction of arrival is determined based on an error discriminant determined from the plurality of sparse solutions for $\hat{S}_t$;

wherein:

$V_n$ includes phase information of the input signals;

$\Theta_t$ represents a grid of points for candidate directions of arrival; and $\Phi$ is a function of $\Theta_t$ and locations of the sensor elements.

In some embodiments, $V_n$ includes a complex envelope of voltages of signal outputs from the plurality of spatially separated sensor elements, and $\Phi$ provides a multiplicative matrix transformation between the complex envelope of voltages at the directions of arrival of the grid points and the complex envelopes of the voltages of the sensor elements.

In some embodiments, the candidate directions of arrival are uniformly spaced in a plane.

In some embodiments, the error discriminant is based on a difference between two magnitudes of solutions for adjacent candidate directions of arrival.

A method comprising receiving, at a processor, M input signals representative of detection a signal received at respective spatially separated sensor elements:

in an initial computation, t=0, determining by a processor a sparse solution for $\hat{S}_t$ in $V_n = \Phi(\Theta_t)\hat{S}_t$;

in at least a first and a second iteration t=1 and t=2 respectively, determining by a processor a sparse solution for $\hat{S}_t$ in $$V_n = \Phi\left[\Theta_{t-1} + \frac{\omega}{2}u\right]_{2\pi}\hat{S}_t;$$

and generating, by a processor an estimated direction of arrival of the signal received at the sensor elements, wherein the estimated direction of arrival is determined based on $\Delta\Theta_t$ in a said iteration;

wherein:

$V_n$ is an M×1 vector for a complex envelope for each of the M input signals;

$\Theta_0$ is an N×1 vector representing N candidate angles of arrival, M<N;

$\Theta_t$ is $(\Theta_{t-1} + \Delta\Theta_t\bar{u})_{2\pi}$;

$\Phi$ is an M×N matrix function of $\Theta_{t-1}$ and locations of the sensor elements;

$\omega$ is an angular distance between two of the N potential angles of arrival;

$\bar{u}$ is a vector of ones;

$$\Delta\Theta_t = D(\alpha_t, \beta_t) = \left(\frac{\alpha_t - \beta_t}{\alpha_t + \beta_t}\right)\left(\frac{\omega}{2}\right);$$

$\Delta\Theta_t$ is determined for $$V_n = \Phi\left(\Theta_{t-1} + \frac{\omega}{2}\bar{u}\right)_{2\pi}S_t;$$

$$n_{max} = \max^{-1}\left[|\hat{S}_o[n]|: 1 \leq n \leq N\right],$$

$$\alpha_t = |\hat{S}_t(n_{max})|, \beta_t = |\hat{S}_t(k_{max})|;$$

$$k_{max} = \begin{cases} n_{max} - 1, & \text{for } 2 \leq n_{max} \leq N, \\ N, & \text{for } n_{max} = 1. \end{cases}$$

In some embodiments, for the purposes of determining at least one of $$\left(\Theta_{t-1} + \frac{\omega}{2}\bar{u}\right)_{2\pi}$$

and $(\Theta_{t-1} + \Delta\Theta_{t-1}\bar{u})_{2\pi}$, $(Q)_{2\pi} = \text{modulo}(Q + \pi\bar{u}, 2\pi\bar{u}) - \pi\bar{u}$ for any vector Q.

In some embodiments, the method further comprises continuing the iterations until a condition $|\Delta\Theta_t| > \Omega$ is not met, where $\Omega$ is a predetermined threshold value.

In some embodiments, the candidate angles of arrival are located in a plane and the estimated direction of arrival is an angle within that plane.

In some embodiments, the candidate angles of arrival, N, are located in a first plane and the estimated direction of arrival is an estimated direction of arrival for that plane and the method further comprises:

repeating the initial computation and the at least one iteration in respect of O candidate angles of arrival in place of the N candidate angles of arrival, wherein the O candidate angles of arrival are located in a second plane having at least a component substantially transverse to the first plane, to determine an estimated direction of arrival for the second plane; and determining a second estimated direction of arrival, based on the estimated direction of arrival for the first and second planes.

In some embodiments, the second plane is perpendicular to the first plane.

In some embodiments, the second plane intersects the first plane along a line having a direction corresponding to the first estimated direction of arrival.

In some embodiments, the method further comprises determining a third estimated direction of arrival by repeating the initial computation and the at least one iteration in respect of P potential angles of arrival in place of the N potential angles of arrival, wherein the P potential angles of arrival are located in a third plane, the third plane intersecting points on a line in three dimensional space corresponding to the second estimated direction of arrival.

In some embodiments, the method further comprises iteratively determining estimated directions of arrival in planes with substantial components transverse to the preceding plane until a threshold minimum variation in estimated direction of arrival is reached.

In some embodiments, the candidate angles of arrival are spatially separated in three dimensional space, whereby $\hat{S}_t$ for t=0 has solution vector elements for both azimuth and elevation and wherein the method further comprises applying the initial computation and the at least one iteration to determine the azimuth in relation to the largest absolute value adjacent pair of elements with constant elevation and applying the initial computation and the at least one iteration to determining the elevation in relation to the largest absolute value adjacent pair of elements with constant azimuth.

In some embodiments, determining the sparse solution comprises utilising a CoSaMP algorithm.

In some embodiments, the method further comprises determining an estimated direction of arrival of a single signal and setting a target number of primary elements in the determined solution for $\hat{S}_t$ at two.

In some embodiments, the method comprises determining estimated directions of arrival of two or more signals and setting a target number of primary elements in the determined solution for $\hat{S}_t$ at double the number of signals for a determination in two dimensional space or at four times the number of signals for a determination in three dimensional space.

A method comprising:

receiving, at a processor, input signals representative of detection of one or more signals received at respective plurality of spatially separated sensor elements;

in an initial determination and in at least a first iteration determining, by a processor, based on phase information in the input signals and a known geometry of the spatially separated sensor elements, one or more sparse solutions indicating one or more estimated directions of arrival amongst a set of candidate directions of arrival, wherein for each iteration the set of candidate directions of arrival are rotated; and generating data indicative of the solution for the first iteration or a subsequent iteration, wherein the generated data represents one or more direction of arrival estimates for the one or more signals.

An iterative method for direction of arrival estimation of a signal at a receiver with a plurality of spatially separated sensor elements, in which a first quantized estimate of the angle of arrival is obtained from a compressive sensing solution of a set of equations relating sensor output signals to direction of arrival is refined in a subsequent iteration by a computed error based a quantized estimate of the direction of arrival in relation to quantization points offset from the quantization points for the first quantized estimate of the angle of arrival, wherein the offset is selected to cause the iterations to converge on an estimated direction of arrival.

An iterative method for angle of arrival estimation, wherein an angle of arrival estimation in relation to a grid of candidate angles of arrival $\Theta$ in one iteration, t-1, the grid having an angular distance $\omega$ between adjacent grid points, is modified for iteration t by an error discriminant defined by $$\Delta\Theta_t = D(\alpha_t, \beta_t) = \left(\frac{\alpha_t - \beta_t}{\alpha_t + \beta_t}\right)\left(\frac{\omega}{2}\right),$$

where, $\hat{S}_t$, is solved in $$V_n = \Phi\left[\left(\Theta_{t-1} + \frac{\omega}{2}\overline{n}\right)_{2\pi}\right]\hat{S}_t$$

using compressive sensing, $$n_{max} = \max^{-1}\left[\left|\hat{S}_o[n]\right|: 1 \le n \le N\right],$$

$$\alpha_t = \left|\hat{S}_t(n_{max})\right|, \beta_t = \left|\hat{S}_t(k_{max})\right|,$$

-continued where, $k_{max} = \begin{cases} n_{max} - 1, & \text{for } 2 \le n_{max} \le N, \\ N, & \text{for } n_{max} = 1. \end{cases}$ In some embodiments the method further comprises repeating the direction of arrival estimation, thereby determining a movement of the estimated direction of arrival over time.

It will be appreciated that the disclosed inventions extend to mathematical equivalents and useful mathematical approximations of the disclosed methods of determination.

In some embodiments the signal is a radio signal, the sensor elements are radio antenna elements, and the measurements are based on phase angles of a complex envelope of output from the radio antenna elements.

In some embodiments the signals are acoustical signals, the sensor elements are acoustical sensors, and the measurements are based on phase angles of a complex envelope of output from the acoustical sensors.

A radio or sound receiver may implement the disclosed method and/or include a disclosed radio antenna or acoustical sensor array. Non-transient memory may include instructions to cause a computational device to perform the disclosed method.

As used herein, except where the context requires otherwise, the term "comprise" and variations of the term, such as "comprising", "comprises" and "comprised", are not intended to exclude further additives, components, integers or steps.

Further aspects of the present disclosure and further embodiments of the aspects described in the preceding paragraphs will become apparent from the following description, given by way of example and with reference to the accompanying drawings.

DETAILED DESCRIPTION

Figure 1:
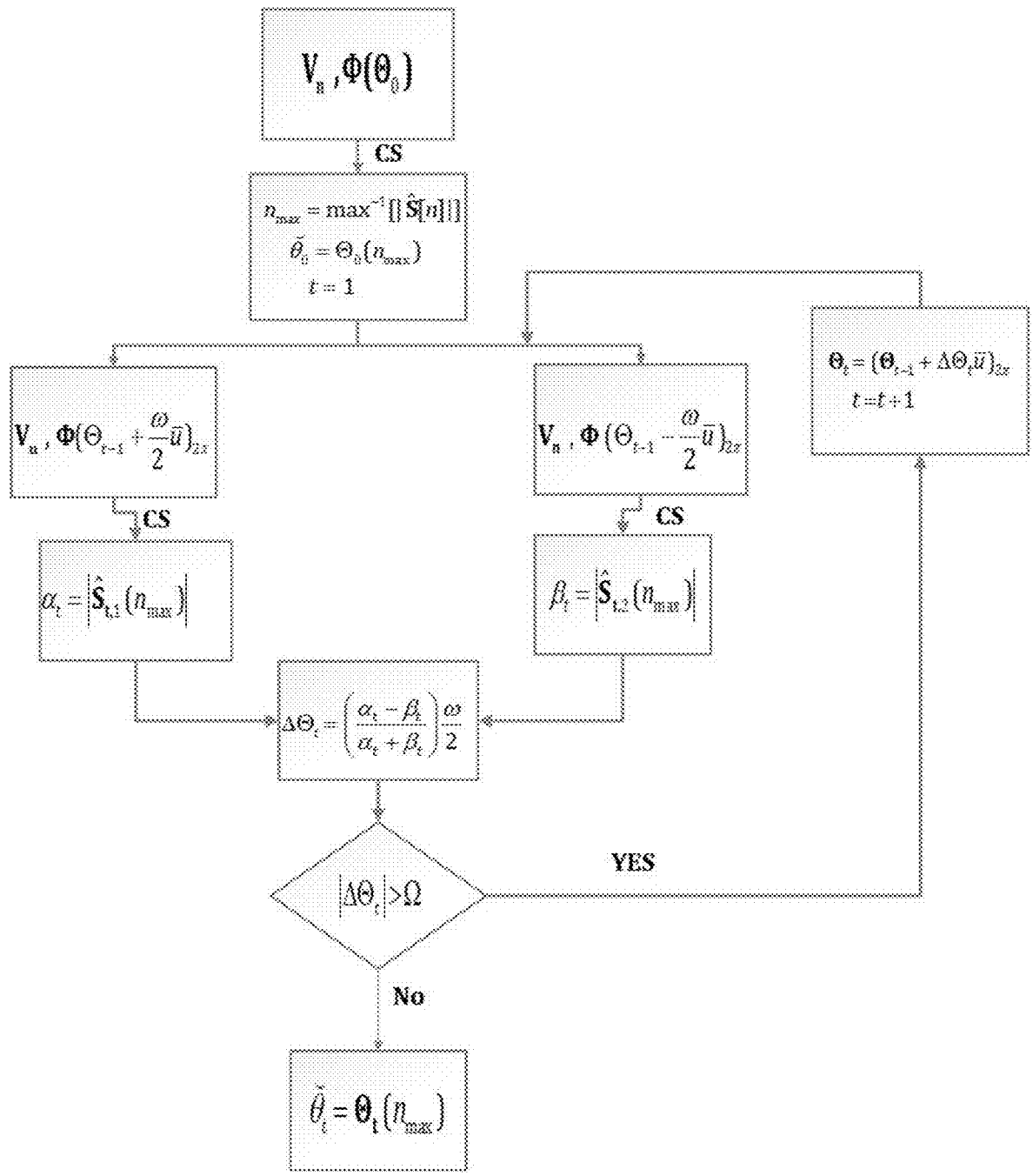
FIG. 1 illustrates a block diagram of an embodiment of an iterative process for DOA estimation.

A method for direction of arrival (DOA) estimation involves the determination of the DOA of a signal, for example a radio signal, from a measured characteristic of the signal, for example from signal complex voltages at the outputs of antenna elements configured in an array. In other examples the signal is a sound signal detected by an array of sound detectors, for example an array of microphones. In other examples the signal is a phase coherent light signal detected by an array of photodetectors.

The array may be 2-dimensional or 3-dimensional. The range of potential angles of arrival is quantized into a grid, in which the number of grid points in the quantization is greater than the number of antenna elements, whereby a sparse recovery problem is created. The grid may have points that are uniformly spaced or non-uniformly spaced. For clarity of illustration the description herein is given with reference to a uniform grid, which in at least some embodiments provides an advantage of requiring reduced computational resources. The grid may extend around all directions or occupy only a subset of directions.

In some embodiments the array of antenna elements is a circular array, which in one embodiment is a uniform circular array (UCA). In other embodiments, the array is a linear array, for example a uniform linear array. The disclosed methods may be used with other forms of uniform and non-uniform arrays. The described technique is applicable to any antenna array geometry.

In some embodiments the measurements are transformed using a transformation function that increases sparsity. For example, in one embodiment the measurements are transformed by a decorrelating transform, which may be an orthogonal transform. In other embodiments the transformation step or process is omitted.

The signals are processed using a computational technique for solving an under-determined set of linear equations. In some embodiments compressive sensing (CS) is used to determine a DOA estimate. Embodiments of compressive sensing are described, for example, in United States Patent publication number 2006/0029279 A1 (Donoho), which is hereby incorporated herein by reference. In some embodiments CS algorithms utilise basis pursuit or another greedy algorithm such as CoSaMP. CS, in particular CoSaMP is the basis of the examples provided herein, but as noted above other techniques for solving an under-determined set of linear equations may be used. The solution indicates the grid point with the greatest signal magnitude and this grid point corresponds to at least an initial estimate of the angle of arrival.

In some embodiments CS is applied with respect to antenna array output and both a first grid and a second grid, different from the first grid. In one implementation the second grid is or can be viewed as an electronic rotation of the first grid, with grid points rotationally offset (frame of reference being potential DOAs) from the grid points in the first grid. CS for the second grid may use the same measurements, e.g., the same set of complex envelope voltage outputs, as were used for the first grid.

In some embodiments CS is performed incorporating a fixed or a variable phase shift from a previous CS determination, for example as described with reference to equations (8) herein. A fixed phase shift may be to rotate the grid points to a mid-point between points in the preceding determination or in a preceding two determinations. A variable phase shift may be determined based on solutions in preceding determinations. In one embodiment a fixed phase shift is used between an initial determination and a second determination and a variable phase shift is used for a third determination.

A measure of relative magnitude between a first identified grid point and a second identified grid point from CS for the first and second grids respectively is used to determine an angular discriminant. The identified grid points indicate a resultant DOA estimate for the first and second grids, for example by being the grid point identified by a maximum value in an output vector from CS. For example, disparate magnitudes indicate an estimated DOA off-centre to the first and second grid points, whereas close or equal magnitudes indicate an estimated DOA at or near the centre of the identified grid points. The angular discriminant is used to determine an estimated direction of arrival. In some embodiments the estimated direction of arrival is determined directly from the angular discriminant and a preceding CS determination. In some embodiments the angular discriminant is used to identify a third grid incorporating a phase shift from the grid used for the preceding CS determination. In some embodiments, information identifying or related to the angular discriminant is output as an indication of a measure of error. In some embodiments the angular discriminant is used as a stop condition for an iterative process to arrive at a DOA estimate.

In some embodiments CS based on the first and second grids, as described above follow CS based on a third grid, whereby the first grid is rotationally offset from the third grid in one direction and the second grid is rotational offset from the third grid in the opposite direction (e.g., clockwise and anti-clockwise respectively). In one embodiment, the grid points of the first and second grids are offset to a mid-point between the grid points of the third grid. In some embodiments rotational offset is iteratively performed until a stop condition is met. In some embodiments the stop condition is the reaching of a threshold. The threshold selected may depend on the application. Examples of a threshold that may be selected include a change in DOA estimate between iterations is less than a predetermined value, a certain number of iterations have been completed, a certain amount of time has elapsed, or the angular discriminant is below a certain level. The threshold may be complex, for example continue until one of a plurality of conditions are met, continue until all of a plurality of conditions are met, or continue until a plurality of conditions are met or one or more other conditions are met.

In some embodiments the iterative procedure is applied to determine the maximum signal amplitude at each of the new grid point sets. These maximum amplitudes are then used in an angular discriminant (e.g., as described herein with reference to Equation (8)), which creates an estimate of the angular estimation error. This estimated angular error is then used to control the magnitude of the offset of the grid points.

In some embodiments the antenna elements are configured to optimise the results of CS. Optimisation variables may include one or both of the number of antenna elements and antenna element placement.

For example, in some embodiments the distance between the antenna elements is configured to optimise one or more parameters that affect at least one of the accuracy and convergence rate of CS and iterative CS. In the case of a UCA, a measure of distance between the antenna elements is the radius (equivalently the diameter) of the array. In some embodiments the one or more parameters include or consist of one or both of mutual coherence and condition number of a matrix of actual or simulated measurements from the array of antenna elements for one or more representative signals (e.g., signals of a particular narrow-band wavelength) of interest for DOA estimation, whereby optimisation includes minimising or at least reducing the mutual coherence and/or condition number. In some embodiments, the optimisation is constrained, for example having regard to physical size or shape constraints for the antenna array. In some embodiments, optimisation comprises locating the local minimum of mutual coherence or condition number that is associated with the smallest value for the condition number or mutual coherence respectively.

In some embodiments the antenna elements are odd in number, which at least in some implementations results in a performance improvement relative to an even number of antenna elements. The methods described are however also applicable to an even number of antenna elements. In particular implementations there are an odd number of elements of at least five elements, or at least nine elements. In some embodiments an odd number of antenna elements, particularly at least five, at least seven or at least nine, are used in combination with an optimised distance between antenna elements, for example an optimised radius in a UCA, as described above. In general, a lower number of antenna elements results in reduced computational complexity, but with a potential cost in accuracy.

In some embodiments the measured characteristics of the signal, for example from signal complex voltages represented as a set of complex envelope voltage outputs, obtained at the outputs of antenna elements configured in an array, is a single measurement value (e.g., a single vector of dimension M, representing the voltages from each antenna element). For example, in one embodiment measurements are obtained from all antenna elements at substantially the same time, so as to obtain a single time sample for use in CS. In another embodiment the sampling is repeated a plurality of times and the results are combined, for example by averaging, into a single measurement value. Using an average may statistically improve the accuracy of the DOA estimate. Using a single measurement value reduces the computational complexity for CS.

From the foregoing description, it can be appreciated that the problem of determining the angle of arrival is represented by a relationship, represented by an under-determined set of equations, which map signals origination at each grid point to the set of complex envelope voltage outputs of the antenna elements. Accordingly, the relations from the received signal from the possible grid points to the voltages at the antenna outputs can be represented by a system of equations. An example discussion of this issue is now provided.

Problem Formulation

A typical realization of the angle of arrival problem is with respect to a planner array of M isotropic omnidirectional elements equally distributed along a circular ring of Uniform Circular Array (UCA) with radius r and angular separation of $$\frac{2\pi}{M}$$

radians. The inter-element spacing $$d = 2r\sin\left(\frac{\pi}{M}\right)$$

is the length of the straight line between two adjacent antenna elements. The angular positions of the antenna elements in UCA are represented by $\{\gamma_m\}$ where $$\gamma_m = \frac{2\pi(m-1)}{M}.$$

An electromagnetic plane wave impinges on the antenna elements from some unknown DOA $\theta_p$. The incident signal is considered to be narrow-band and characterized by the same frequency content. The narrow-band assumption states that all frequencies in the observed band have the same phase shift. This simplifies the construction of steering vector given in equation (2). Under the following assumption, the output of mth antenna array can be written as, $$v_m = \sum_{i=1}^{P} s_i^{inc} \tau_m(\theta_i) \tag{1A}$$

where $$\tau_m(\theta_i) = e^{jbr\cos(\theta_i - \gamma_m)} \tag{2A}$$

and
$s_i^{inc}$ represents the ith impinging wave,
b is the angular wavenumber ($2\pi/\lambda$),
r is the radius of UCA,
$\theta_p$ in the angle of arrival of pth incident wave,
$\gamma_m$ is the angular position of mth element,
$\lambda$ is the wavelength of the wave,
and, P is the number of impinging waves.
Or in the case of three dimensions:

$$v_m = \sum_{i=1}^{P} s_i^{inc} \tau_m(\theta_i, \psi_i) \tag{1}$$

where, $$\tau_m(\theta_i, \psi_i) = e^{-jbr\cos(\theta_i - \gamma_m)\cos(\psi_i)} \tag{1}$$

and,
$s_i^{inc}$ represents the $i^{th}$ impinging wave
b is the angular wavenumber $$\left(\frac{2\pi}{\lambda}\right)$$

r is the radius of the UCA,
$\theta_i$ is the angle of arrival of the ith incident wave,
$\gamma_m$ is the angular position of the mth element, λ is the wavelength of the wave, and
i is the index of the impinging wave. Or in the case of three dimensions:

$$v_m = \sum_{i=1}^{P} s_i^{inc} \tau_m(\theta_i, \psi_i) \quad (1)$$

where $$\tau_m(\theta_i, \Psi_i) = e^{jbr\cos(\theta_i - \gamma_m)\cos(\Psi_i)} \quad (2)$$

and,
$s_i^{inc}$ represents the $i^{th}$ impinging wave
b is the angular wavenumber $$\left(\frac{2\pi}{\lambda}\right)$$

r is the radius of the UCA
$\theta_i$ is the azimuth angle of the $i^{th}$ impinging wave
$\Psi_i$ is the elevation angle of the $i^{th}$ impinging wave
$\gamma_m$ is the angular position of the $m^{th}$ element
λ is the wavelength of the wave
The phase of $\tau_m$ is the phase shift due to the increased travel distance of the incoming signal in reference to the first element, while it is being received by the $m^{th}$ element of UCA.

DOA Estimation Using Compressive Sensing

Received open-circuit voltage information at each antenna element is combined to formulate a sparse matrix problem, which may be solved using CS techniques to identify the DOA of an unknown target. To incorporate the architecture of CS into the system model, angular space is being quantized into N discrete regions, each region having a representation value, or grid point. SF discretises the entire $2\pi$ radian angular domain into N possible DOAs, $\Theta = \{\hat{\theta}_n, 1 \leq n \leq N\}$ where N denotes the number of grid points. The incoming DOA, $\theta$ can be anywhere in the range $[-\pi,\pi)$. Using the relationship between output of each antenna elements and DOA of the target in equation (1) and rewriting it in matrix form gives:

$$V = \Phi(\Theta) S \quad (3)$$

where, $$\Phi(\Theta) = \begin{pmatrix} \tau_1(\hat{\theta}_1) & \tau_1(\hat{\theta}_2) & \cdots & \tau_1(\hat{\theta}_N) \\ \tau_2(\hat{\theta}_1) & \tau_2(\hat{\theta}_2) & \cdots & \tau_2(\hat{\theta}_N) \\ \vdots & \vdots & \ddots & \vdots \\ \tau_M(\hat{\theta}_1) & \tau_M(\hat{\theta}_2) & \cdots & \tau_M(\hat{\theta}_N) \end{pmatrix} \quad (4)$$

and, $V = \{v_m, 1 \leq m \leq M\}$ is a one-dimensional column vector representing the complex output at each antenna elements of UCA. $\Phi(\Theta)$ is the dictionary matrix, where $\tau_m(\hat{\theta}_n)$ is calculated using equation (2). In general, $\Phi(\Theta)$ can be computed for any antenna array geometry, (in 2 or 3-dimensional space) and any set of grid points (in 2 or 3-dimensional space). The iterative algorithm is in this sense universally applicable.

The column $\Phi(\Theta)$ represents an M-element array response vector, for an incoming plane wave arriving from the direction $\hat{\theta}_n$. The vector $S = \{s_n^{inc}, 1 \leq n \leq N\}$ is a one-dimensional column vector of size N, where $s_n^{inc}$ represents the incoming plane wave from the direction $\hat{\theta}_n$. The outputs of antenna elements in equation (3) will be corrupted with a noise vector $\eta_{M \times 1}$. The entries of $\eta_{M \times 1}$ are statistically independent and are extracted from a complex Gaussian distribution with zero mean and variance $\sigma^2$. The effect of noise on the output observation can be expressed as.

$$V_n = \Phi(\Theta)S + \eta \quad (5)$$

The system defined in (5) is an under-determined set of equations, where M<N, and can be formulated as a CS problem to recover an estimate $\hat{S}$ of the original sparse vector S via convex optimization as shown in (1). Therefore $$\hat{S} = \min_{S \in C^N} \|S\|_0 \text{ s.t. } \|V_n - \Phi(\Theta)S\|_2 < \varepsilon \quad (6)$$

where is the $\|\cdot\|_p$ is the $l_p$ norm and $\varepsilon$ is the regularization parameter that is being determined by the noise or quantization level. Since the model assumes a single transmitting source among the N possible DOAs, the recovered sparse vector will have only one nonzero element. The index n of the non-zero element refers to the angular grid $(\hat{\theta}_n)$ corresponding to the source DOA. Additionally, $\varepsilon$ can be increased to cater for optimized designed for small antenna geometries, with close spacing between the antenna elements.

Multi-Resolution Approach

An assumption that the source is located on one of the angular grid points may not provide sufficiently accurate DOA estimation for at least some applications. In an ideal situation under this assumption, when the DOA of the source is on the grid, i.e. $\theta \in \{\hat{\theta}_n, 1 \leq n \leq N\}$, the sparse vector solution discussed above enables detection of the DOA of the source. However, in a typical scenario when the source DOA is off the grid, i.e., $\theta = \hat{\theta}_n + \Delta\theta$, where $$-\frac{\pi}{N} \leq \Delta\theta \leq \frac{\pi}{N},$$

the DOA estimate includes an error. The dictionary mismatch between processed observation $V_n$ and measurement matrix $\Phi$, forces the optimized solution vector S to generate several peaks at neighbouring grid points. In such cases, for an off-grid DOA$\theta$, CS generates peaks at $\hat{\theta}_k$ and $\hat{\theta}_{k+1}$, which are the neighbouring angular grids closest to the original off-grid DOA$\theta$. To address this, the estimation process includes a two-stage strategy, wherein at the first stage, an index corresponding to the maximum amplitude is chosen as a coarse estimation $\check{\theta}_0$. The coarse estimate of $\theta$, $\check{\theta}_0$, may be obtained from, $$n_{max} = \max^{-1}\{|\hat{S}_0[n]|\} \quad (7)$$

such that, $$\hat{S}_0 = \min_{S \in \square^N} \|S\|_1 \text{ st } \|V_n - \Phi(\Theta_0)S\|_2 < \varepsilon$$

and $$\check{\theta}_0 = \Theta_0(n_{max})$$

where, $\hat{S}_0[n]$ is the $n^{th}$ element of the recovered sparse vector after CS processing, and $\Theta_0$ represents the set of N discrete azimuth angular grid points.

Assuming the Signal to Noise Ratio (SNR) is relatively high, there is a high probability that $$\theta \in \left[\breve{\theta}_0 - \frac{\omega}{2}, \breve{\theta}_0 + \frac{\omega}{2}\right)$$

where $$\omega = \frac{2\pi}{N}$$

is the angular grid separation. The determination of the course estimate in (7) is followed by an iterative process in the second stage. In the second stage, new grid points are determined, which usefully may be located at ½ the distance between the grid points used for the previous estimated angle of arrival. In one embodiment, two modified sparse vectors $\hat{S}_{t,1}$ and $\hat{S}_{t,2}$ are recovered by introducing a grid shift of $$-\frac{\omega}{2}$$

and $$\frac{\omega}{2},$$

on the N possible DOAs $\Theta$. In another embodiment, a single new modified vector $\hat{S}_t$ is obtained due to the angular rotation of the grid points by $$\frac{\omega}{2}$$

in one direction. t=1,2,3, . . . is the iteration number. In each iteration the magnitudes of the recovered sparse vector are used to determine a correction factor, which enables the algorithm to converge to an accurate estimate.

The coarse estimate is obtained by obtaining a compressive sensing solution of:

$V_n = \Phi(\Theta_0)\hat{S}_o$.

In particular, using compressive sensing, $\hat{S}_0$ is obtained by:

$\hat{S}_0 = \min\|S_0\|_1$, such that $\|V_n - \Phi(\Theta_o)S_o\|_2 < \varepsilon$, where $\|\cdot\|_p$ is the $l_p$ norm of a vector.

Then, $n_{max} = \max^{-1}[|\hat{S}_o[n]|: 1 \le n \le N]$ and $\breve{\theta}_o = \theta(n_{max})$, where $\breve{\theta}$ is a coarse (quantized) estimate of the angle of arrival of the signal.

More accurate estimates of the angle of arrival than the initial coarse estimate are obtainable through creating additive correction terms and applying these correction terms to the coarse estimate of the angle of arrival. The determination of the correction terms and the more accurate estimate of the angle of arrival are done in an iterative computational procedure.

For the first step of the iteration, define, $$\Delta\Theta_1 = D(\alpha_1, \beta_1) = \left(\frac{\alpha_1 - \beta_1}{\alpha_1 + \beta_1}\right)\left(\frac{\omega}{2}\right),$$

where $$V_n = \Phi\left[\left(\Theta_0 + \frac{\omega}{2}\overline{u}\right)_{2\pi}\right]\hat{S}_1$$

where, $(Q)_{2\pi}$=modulo$(Q+\pi\overline{u}, 2\pi\overline{u}) - \pi\overline{u}$ for any vector Q,
$\overline{u}$ is the N×1 vector for which every element is 1.
$\Delta\Theta_1$ is the correction factor for the first iteration, $D(\alpha_1, \beta_1)$ is an angle of arrival error discriminant based on parameter defined in the following.

$\hat{S}_1$. is solved by using compressive sensing.
Therefore $\hat{S}_1 = \min\|S_1\|_1$ such that $$\left\|V_n - \Phi\left[\left(\Theta_0 + \frac{\omega}{2}\overline{u}\right)_{2\pi}\right]\hat{S}_1\right\|_2 < \varepsilon$$

$n_{max} = \max^{-1}[|\hat{S}_0[n]|: 1 \le n \le N],$ $\alpha_1 = |\hat{S}_1(n_{max})|,$ $\beta_1 = |\hat{S}_1(k_{max})|,$ where, $$k_{max} = \begin{cases} n_{max} - 1, & \text{for } 2 \le n_{max} \le N, \\ N, & \text{for } n_{max} = 1. \end{cases}$$

A correction factor for the phase estimate is computed using the error discriminant, $$\Delta\Theta_1 = D(\alpha_1, \beta_1) = \left(\frac{\alpha_1 - \beta_1}{\alpha_1 + \beta_1}\right)\left(\frac{\omega}{2}\right)$$

All of the grid points are rotated by $\Delta\Theta_1$ which is represented as, $\Theta_1 = (\Theta_0 + \Delta\Theta_1\overline{u})_{2\pi}$ and therefore the estimate of the angle of arrival after the t=1 iteration is, $\breve{\theta}_1 = \Theta_1(n_{max}) = \Theta_0(n_{max}) + \Delta\Theta_1 = \breve{\theta}_0 + \Delta\Theta_1$ where $\Delta\Theta_1$ is a correction factor for the coarse estimate $\breve{\theta}_0$. For the second iteration, if required, define $$\Delta\Theta_2 = D(\alpha_2, \beta_2) = \left(\frac{\alpha_2 - \beta_2}{\alpha_2 + \beta_2}\right)\left(\frac{\omega}{2}\right)$$

where $$V_n = \Phi\left[\left(\Theta_1 + \frac{\omega}{2}\overline{u}\right)_{2\pi}\right]\hat{S}_2$$

$\hat{S}_1$. is solved using compressive sensing, $\hat{S}_2 = \min\|S_1\|_1$ such that $$\left\|V_n - \Phi\left(\Theta_1 + \frac{\omega}{2}\overline{u}\right)_{2\pi} S_2\right\|_2 < \varepsilon$$

$n_{max} = \max^{-1}[|\hat{S}_o[n]|: 1 \le n \le N]$, $\alpha_2 = |\hat{S}_2(n_{max})|$, $\beta_2 = |\hat{S}_2(k_{max})|,$ where, $k_{max} = \begin{cases} n_{max} - 1, & \text{for } 2 \le n_{max} \le N, \\ N, & \text{for } n_{max} = 1 \end{cases}$.

A correction factor for the phase estimate is computed using the error discriminant:

$$\Delta\Theta_2 = D(\alpha_2, \beta_2) = \left(\frac{\alpha_2 - \beta_2}{\alpha_2 + \beta_2}\right)\left(\frac{\omega}{2}\right).$$

All of the grid points are rotated by $\Delta\Theta_2$, which is represented as: $\Theta_2 = (\Theta_1 + \Delta\Theta_2\overline{u})_{2\pi} = (\Theta_0 + \Delta\Theta_1\overline{u} + \Delta\Theta_2\overline{u})_{2\pi}$.

Therefore, the estimate of the angle of arrival after the t=2 iteration is: $\breve{\theta}_2 = \Theta_2(n_{max}) = \Theta_1(n_{max}) + \Delta\Theta_2 = \breve{\theta}_0 + \Delta\Theta_1 + \Delta\Theta_2,$ where $\Delta\Theta_2$ is the additional correction factor on the coarse estimate.

The iterative algorithm almost always converges after the second (t=2) iteration. Accordingly, in some embodiments the number of iterations is fixed at 2. In other embodiments, more than two iterations may be used.

For iteration t:

$$\Delta\Theta_t = D(\alpha_t, \beta_t) = \left(\frac{\alpha_t - \beta_t}{\alpha_t + \beta_t}\right)\left(\frac{\omega}{2}\right), \text{ where } V_n = \Phi\left[\left(\Theta_{t-1} + \frac{\omega}{2}\overline{u}\right)_{2\pi}\right]\hat{S}_t.$$

$\hat{S}_t$ is solved by using compressive sensing, $\hat{S}_t = \min\|S_t\|_1$ such that $$\left\|V_n - \Phi\left(\Theta_{t-1} + \frac{\omega}{2}\overline{u}\right)_{2\pi} S_t\right\|_2 < \varepsilon$$

$$n_{max} = \max^{-1}\left[|\hat{S}_o[n]|: 1 \le n \le N\right], \alpha_t = |\hat{S}_t(n_{max})|,$$

$$\beta_t = |\hat{S}_t(k_{max})|, \text{ where, } k_{max} = \begin{cases} n_{max} - 1, & \text{for } 2 \le n_{max} \le N, \\ N, & \text{for } n_{max} = 1. \end{cases}$$

A correction factor for the phase estimate is computed using the error discriminant, $$\Delta\Theta_t = D(\alpha_t, \beta_t) = \left(\frac{\alpha_t - \beta_t}{\alpha_t + \beta_t}\right)\left(\frac{\omega}{2}\right)$$

All of the grid points are rotated by $\Delta\Theta_t$ which is represented as, $$\Theta_t = (\Theta_{t-1} + \Delta\Theta_t \overline{u})_{2\pi} = \left(\Theta_0 + \left(\sum_{k=1}^{t}\Delta\Theta_k\right)\overline{u}\right)_{2\pi} \quad (8)$$

and therefore the estimate of the angle of arrival after the iteration t is, $$\hat{\theta}_t = \Theta_t(n_{max}) = \Theta_{t-1}(n_{max}) + \Delta\Theta_t = \hat{\theta}_0 + \left(\sum_{k=1}^{t}\Delta\Theta_k\right),$$

where, $\Delta\Theta_t$ is the correction factor for the coarse estimate after iteration t.

The variables in the description above can be described as follows:

$\hat{S}_t$ is the N×1 minimum sparsity solution angle of arrival indicator vector for iteration t, $V_n$ is the M×1 vector of complex envelope voltages at each of the M antenna elements, $\Phi$ is the M×N observation matrix which depends upon the geometry of the antenna locations in the array and the positions of the angular grid points, $\alpha_t$ is the magnitude of the solution vector element corresponding to a counter-clockwise shift of the previous angle of arrival estimation by ½ a quantization interval, $\beta_t$ is the magnitude of the solution vector element corresponding to a clockwise shift of the previous angle of arrival estimation by ½ a quantization interval, $$\omega = \frac{2\pi}{N}$$

is the angular quantization step size, $$D(\alpha_t, \beta_t) = \left[\frac{\alpha_t - \beta_t}{\alpha_t + \beta_t}\right]\frac{\omega}{2}$$

is the error discriminant for iteration t, $$\Delta\Theta_t = \left[\frac{\alpha_t - \beta_t}{\alpha_t + \beta_t}\right]\frac{\omega}{2}$$

is the scalar output of the error discriminant for iteration t
$\Theta_t$ is the vector of N grid points for iteration t,
$\Theta_t(n_{max})$ is the angle of arrival estimate for iteration t.

In the preceding description, a vector Q, $(Q)_{2\pi}$ is defined as $$(Q)_{2\pi} = \text{modulo}(Q + \pi\overline{u}, 2\pi\overline{u}) - \pi\overline{u}.$$

This equation describes the $2\pi$ modulo operation on each of the elements in Q. By adopting this, a rotation in only one direction (either direction) is required to determine the angular discriminant. In alternative embodiments a rotation of $$-\frac{\omega}{2}\overline{u}$$

is used in addition to the rotation $$+\frac{\omega}{2}\overline{u},$$

with a corresponding increase in computational resources. In the case of a non-uniform grid of points, $\omega$ may differ for each direction, to maintain the rotated position at a half interval to either side of the course estimate.

In an alternative embodiment, an angular discriminant, for example the angular discriminant $D(\alpha_t, \beta_t)$ described above, is determined based on a first or initial compressive sensing, for example $V_n = \Phi(\Theta_0)\hat{S}_o$ as described above. In the solution vector $\hat{S}_o$ a maximum term is identified, and the maximum adjacent term is also identified. The angular discriminant is then computed based on the identified maximum term and maximum adjacent term. The grid points are then rotated by the angular discriminant for a first iteration. Subsequent iterations, if any, are performed as described above. If the adjacent terms on both sides of the maximum term are equal, then the estimated angle of arrival is the angle corresponding to the grid point for the maximum.

If there are two equal sized adjacent maxima in a compressive sensing solution, then the estimated angle of arrival is determined as the mid-point of the grid points corresponding to the two maxima.

The initial estimate of the angle of arrival is the angle corresponding to the mid-point between the angles corresponding to the two largest magnitude values of ▭. This midpoint is the initial angle of arrival estimate $\check{\theta}_o$ $\alpha_1$ and $\beta_1$ are the two largest magnitudes of adjacent components of the $\hat{S}_o$ vector.

$\alpha_1$ and $\beta_1$ are then the input to $D(\alpha_1, \beta_1)$ and the output of this discriminant is the correction factor $\Delta\Theta_1$. The angle of arrival estimate after the first iteration is $\hat{\theta}_1 = \hat{\theta}_0 + \Delta\Theta_1$.

The grid points are then rotated by $\Theta_1 = (\Theta_0 + \Delta\Theta_1 \bar{u})_{2\pi}$ The alternative embodiment of the algorithm has reduced computational complexity. One compressive sensing solution and one computation of the $\Phi$ matrix are eliminated by the alternative embodiment.

In some embodiments, the stopping criterion of the algorithm is determined by a user-defined threshold, for example for a fixed number of iterations or for $D(\alpha_t, \beta_t) < \Omega$.

The algorithm terminates at iteration t and $\hat{\theta}_t = \Theta_t(n_{max})$.

In some embodiments, a compressive sensing algorithm is used that accommodates predetermination of the sparsity of the solution vector. For one transmitting source, the sparsity is set to 2, because there will be two significant adjacent elements in the solution vector. In the case of P signal sources, the sparsity is set to 2P. The CoSaMP algorithm is an example algorithm that accommodates predetermination of the sparsity of the solution vector and as such has particular application to the disclosed methods of direction of arrival estimation.

Compressive Sensing

An example discussion of CS is now provided.

Compressive sensing is a mathematical framework that deals with the recovery of a sparse vector $x_{n \times 1}$, from an observation vector $y_{n \times 1}$ with $M << N$. The measurement paradigm consists of linear projection of the signal vector via a known projection matrix $\Psi_{M \times N}$. As $M << N$, the recovery of sparse vector x from the measurement vector y becomes an underdetermined problem with an infinite number of solutions. In a CS framework, an accurate estimation of a sparse signal x can be obtained in the following reconstruction problem:

$$\min \|x\|_1 \text{ s.t. } \|y - \Psi x\|_2 \leq \zeta, \quad (9)$$

where $\|\cdot\|_p$ is the $l_p$-norm and $\zeta$ bounds the amount of noise in the observation data. A vector x is said to be K-sparse, if $\|x\|_0 = K$. A matrix $\Psi$ is said to have satisfied the RIP (Restricted Isometry Property) of order K, if there exists a $\delta_k \in (0, 1)$ such that $$(1-\delta_k)\|x\|_2^2 \leq \|\Psi x\|_2^2 \leq (1+\delta_k)\|x\|_2^2 \quad (10)$$

If $\psi$ satisfied the above condition, there is a high probability of successfully recovering a sparse signal from noisy measurements, as long as the spark$(\psi) > 2K$. The spark of a matrix is the smallest number of columns in matrix $\Psi$ that are linearly independent. The larger the spark, the bigger the signal space, allowing CS to guarantee exact recovery. Although the spark and the RIP provides guarantees for the recovery of a k-sparse vector, verifying that a matrix satisfies any of the above properties has a combinatorial computation complexity, since each time one must consider $$\binom{n}{k}$$

submatrices. Therefore, it is preferable to use a property of a matrix which is easily computable and provides guarantees of recovery.

The mutual coherence of a matrix $\psi$, $\mu(\Psi)$ is the largest absolute inner product between two columns $\Psi_i$ and $\Psi_j$ where $\Psi_i$ is the i th column of $\Psi$ and $\Psi_j$ is the j th column of $\Psi$.

$$\mu(\Psi) = \max_{1 \leq i \neq j \leq n} \frac{|(\psi_i, \psi_j)|}{\|\psi_i\|_2 \|\psi_j\|_2} \quad (11)$$

The mutual coherence of a matrix $\Psi$ is always bounded in the range $$\mu(\Psi) \in \left[ \sqrt{\frac{N-M}{M(N-1)}}, 1 \right],$$

where the lower bound is known as the Welch Bound. Note that when $N >> M$, the lower bound is approximately equal to $$\frac{1}{\sqrt{M}}.$$

If the original signal x satisfies the following requirements, $$\|x\|_0 = K < \frac{1}{2}\left(1 + \frac{1}{\mu(\Psi)}\right), \quad (12)$$

then, CS algorithms such as basis pursuit or other greedy algorithms such as COSAMP can be used to guarantee the recovery of x from under-determined set of equations.

A rectangular matrix such as $\Psi_{M \times N}$ does not possess quantifiable parameters such as eigenvalues to determine the structure of the matrix. However, $Q = \Psi^T \Psi$ can be considered as a square matrix and the eigenvalues of Q can be related back to quantify the property of $\Psi$. The singular values $\rho_1, \ldots \rho_m$ of a m×n matrix $\Psi$ are the positive square roots, $\rho_i = \sqrt{\lambda_i} > 0$, of the non-zero eigenvalues of the associated Gram matrix $Q = \Psi^T \Psi$. Singular values of $\Psi$ can be used to introduce another quantifiable parameter known as condition number, expressed as, $$\Upsilon(\Phi) = \frac{\rho_{max}}{\rho_{min}} \quad (13)$$

where $\rho_{min}$ and $\rho_{max}$ are the smallest and largest singular value associated with the matrix $\Psi$. The condition number plays a vital role in providing a geometric interpretation of the action of the matrix. A matrix with lower condition number suggests strong convergence to an accurate and unique solution.

Array Geometry Optimization

In some embodiments the array of antenna elements is configured to optimise CS. Additionally or alternatively, the number of elements in the array may vary from a conventional approach of an inter-element separation, $$d \in \left[ \frac{\lambda}{2}, \lambda \right]$$

between the antenna elements to avoid ambiguity between the steering vectors of distinct DOAs.

Figure 3:
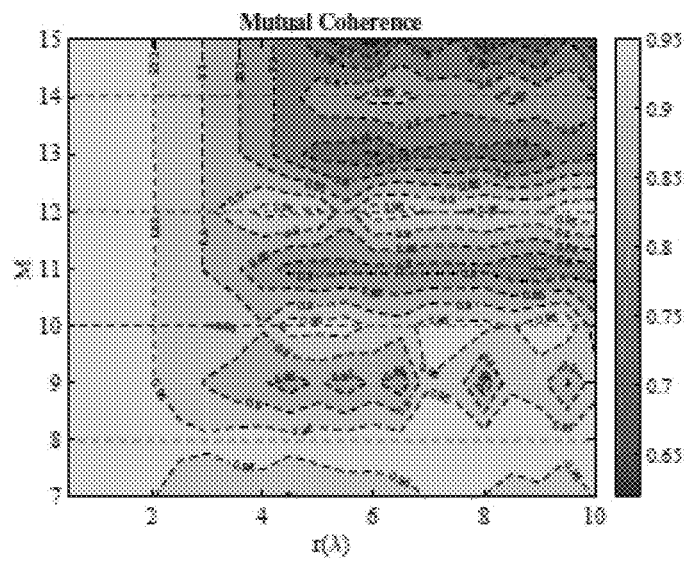
FIG. 3 illustrates a contour plot of mutual coherence for UCA as an antenna geometry.

FIG. 3 shows a contour plot on the effect of antenna elements on $\mu(\Phi)$. In the contour plot $\mu(\Phi)$ is measured when constructed by varying M and the radius r in the range of [7,16] and [$\lambda$,10$\lambda$] respectively. The figure suggests that for an increase in odd M (7,9,11, . . . ) the reduction in mutual coherence is much sharper compared to even M (8,10,12, . . . ). Especially for M=9, Φ has a lower µ compared to M∈[8,10,12] and µ(Φ) achieves the minimum point for M=16. When the minimum µ(Φ) for M=11 is compared with M=12, it can be seen that, in case of UCA constructed with M=11 antenna elements, µ(Φ) is reduced by a factor of 10. The result clearly shows that the ambiguity between two distinct DOA can be significantly reduced in case of odd number of M>9.

Figure 4:
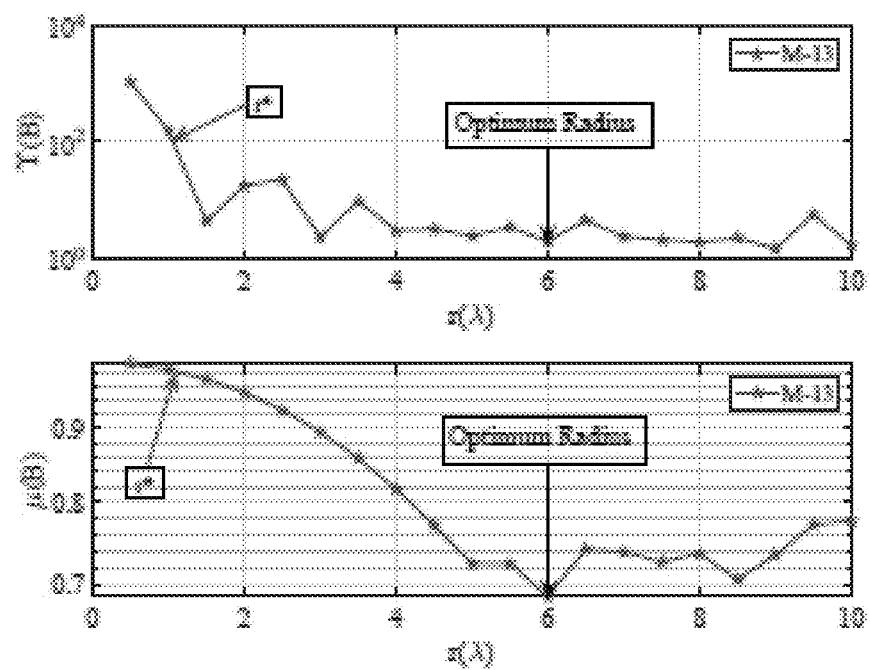
FIG. 4 illustrates a line plot illustrating the impact of the radius of an UCA on the mutual coherence and condition number of the measurement matrix $\Phi$.

Although $$d = \frac{\lambda}{2}$$

has been used as an optimum separation to perform trade-off between mutual coupling and grating lobes, a geometry with $$d > \frac{\lambda}{2}$$

or d>λ or d>2λ or d>3λ or d>4λ or d>5λ may be used with the DOA methods described herein. Also, a geometry with or d>1.5λ or d>2.5λ or d>3.5λ or d>4.5λ or d>5.5λ may be used with the DOA methods described herein. Referring to the example of UCA, FIG. 4 shows the variation in γ(Φ) and µ(Φ) with respect to varying radius of UCA for M=13 when r is varied between $$\frac{\lambda}{2}$$

and 10λ with an increment of $$\frac{\lambda}{2}.$$

In the plot the arrow marked r* refers to a radius of the array such that the inter-element spacing between the antenna elements is $$\frac{\lambda}{2}.$$

It can be seen that at r* both γ(Φ) and µ(Φ) are significantly higher than at other points and hence is not optimal for an accurate recovery of using CS. An antenna array may be optimised by having a radius such that both γ(Φ) and µ(Φ) are minimized. An optimum radius $r^{opt}$ that contributes to the minimization of γ(Φ) and µ(Φ) may maximize the incoherence between the columns of Φ and efficient utilization of the vector space for CS operation. FIG. 3 indicates that at optimum radius $r^{opt}$=6λ, γ(Φ) and µ(Φ) are reduced by a factor of 12 and 20 respectively compared to r*. FIG. 3 also indicates that the performance remains relatively steady between around 5λ to 9λ and at above around 9λ the performance starts to degrade. Accordingly, an antenna may be configured with d<9λ or d<10λ. A similar approach can be used to obtain the optimum radius for any UCA with M antenna elements.

In general, an optimum separation of antenna elements in the array is dependent on the number of antenna elements in the array. For example, for a UCA, a radius of about 6λ may be suited to about 9 to 17 antenna elements. A radius of about 8λ may be suited to 19 to 21 antenna elements. In some embodiments, the radius may be selected so that the number of antenna elements is within about 1.5 to 3 times the radius, or within 2 to 3 times the number of antenna elements.

In some embodiments, the distance between the antenna elements may be about 0.5λ. In other embodiments the distance between the antenna elements may be between 1λ and 2λ or between 1λ and 1.5λ or between 1.1λ and 1.5λ.

Phase Determination

In some embodiments, the phase information in $V_n$ described above, which is utilised for DOA estimation, is directly indicative of the relative phase between the complex envelopes received at the antenna elements. In other embodiments the phase information in $V_n$ is indicative of the phase of the complex envelope relative to a local oscillator. Using a local oscillator facilitates embodiments with larger signal to noise ratio.

Example Process Flow

FIG. 1 shows an example process flow for determining an estimated direction of arrival of a signal at an array of M antenna elements. An initial grid of N candidate directions of arrival is defined, with N greater than M to result in a sparse problem. The grid is rotated in both directions and an angular discriminant determined based on the rotated grid. The angular discriminant controls the extent of rotation of any subsequent iterations. An estimated direction of arrival is output when a threshold condition is met.

Figure 2:
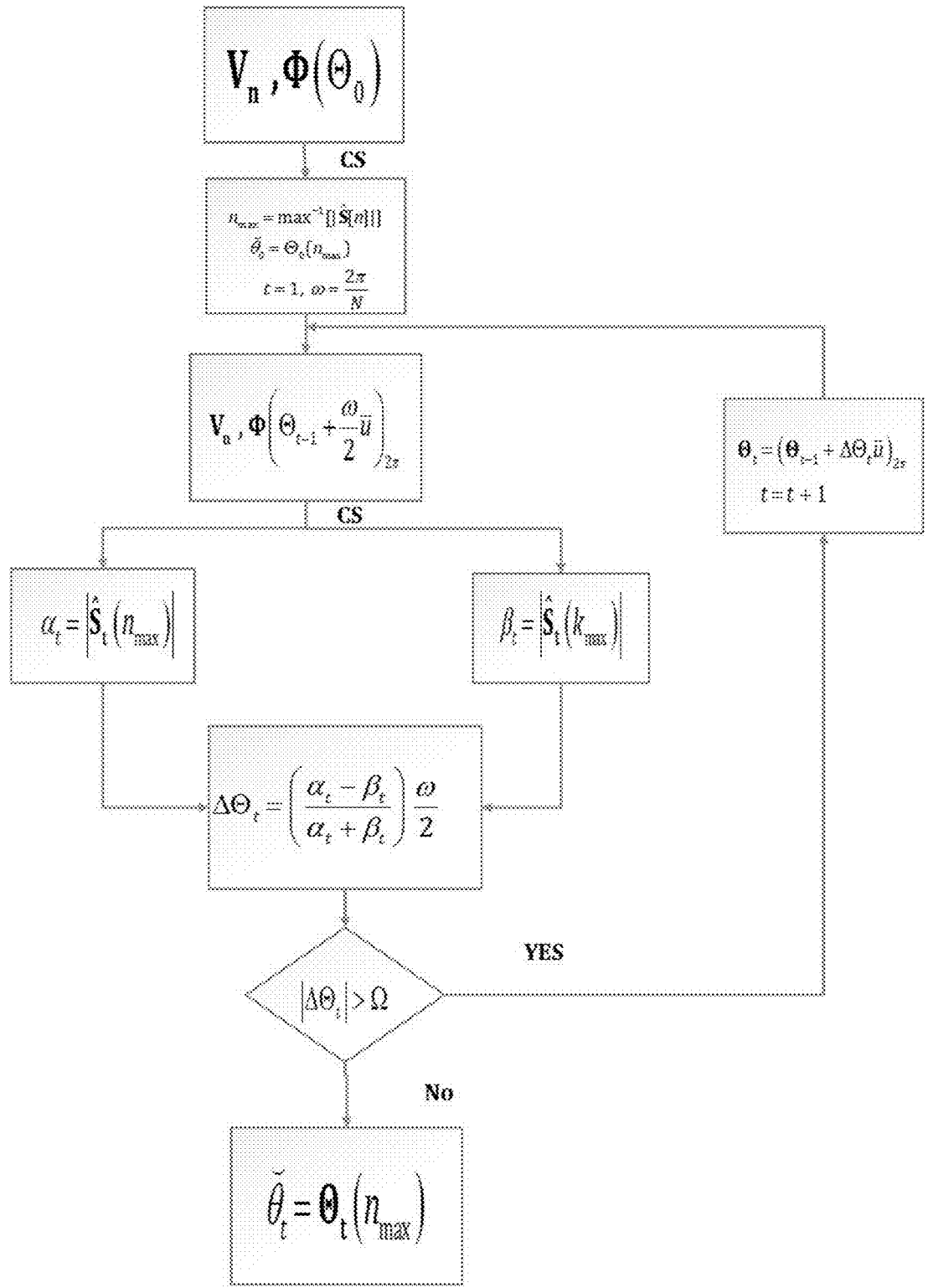
FIG. 2 illustrates a block diagram of another embodiment of an iterative process for DOA estimation.

FIG. 2 shows another example process flow for determining an estimated direction of arrival of a signal at an array of M antenna elements. An initial grid of N candidate directions of arrival is defined, with N greater than M to result in a sparse problem. After an initial compressive sensing determination, the grid is rotated and the compressive sensing determination repeated. An angular discriminant is determined based on the solution vectors. The angular discriminant controls the extent of rotation of any subsequent iterations. An estimated direction of arrival is output when a threshold condition is met.

The process flows may be modified to enable DOA estimation in three-dimensional space.

In some embodiments, an estimated angle of arrival in three-dimensional space is determined based on individual determinations for transverse planes. For example, in some embodiments, the candidate directions of arrival are located in a first plane and the estimated direction of arrival is an estimated direction of arrival for that plane. To determine the DOA in three-dimensional space, the method further includes repeating the determinations in respect of candidate angles of arrival located in a second plane having at least a component substantially transverse to the first plane, to determine an estimated direction of arrival for the second plane. An estimated direction of arrival is then based on the estimated direction of arrival for the first and second planes.

In some embodiments, the second plane is perpendicular to the first plane. In some embodiments, the second plane intersects the first plane along a line having a direction corresponding to the first estimated direction of arrival. In some embodiments the method further comprises repeating the determinations in respect of a grid of candidate angles of arrival located in a third plane, the third plane intersecting points on a line in three-dimensional space corresponding to the second estimated direction of arrival. In some embodiments, the method comprises iteratively determining estimated directions of arrival in planes with substantial components transverse to the preceding plane until a threshold minimum variation in estimated direction of arrival is reached.

In some embodiments, the N potential angles of arrival are spatially separated in three-dimensional space, whereby $\hat{S}_t$ for t=0 has solution vector elements for both azimuth and elevation. The method may then comprise applying at least the iterations t=1 and t=2 to determine the azimuth in relation to the largest absolute value adjacent pair of elements with constant elevation and applying at least the iterations t=1 and t=2 to determining the elevation in relation to the largest absolute value adjacent pair of elements with constant azimuth.

Simulation

A simulation was carried out on N=180 angular grid points, with $$\omega = \frac{2\pi}{N}.$$

The scanning angle ranges between $[-\pi, \pi)$ radians. The signal is considered to be transmitted at centre frequency of $f_c$ MHz, and the wavelength is $\lambda$. A simulated UCA consists of 13 isotropic antenna elements distributed evenly on a circular ring with $r=r^{opt}=6\lambda$. The inter-element distance d between the antenna elements is approximately $3\lambda$. The simulation scenario has one source, transmitting from any angle in the range between $[-\pi,\pi)$ radians. The signals have been supposed to be arriving on the antenna with equal strength in order to perform an unbiased analysis of the accuracy of the method with respect to the angles of arrival.

In order to determine the robustness of the system model, the following noise sensitivity test was considered. The Signal-to-Noise-Ratio (SNR) is calculated at the receiver as the ratio of the sum of the power received from M antenna elements to $\sigma^2$ where, $\sigma^2$ is the variance of the complex Gaussian noise. The measured data are characterized by $SNR_{dB}=[-10, -5, 0, 5, 10, 15, 20, 25]$, defined as, $$SNR_{dB} = 10\log_{10}\left[\frac{\sum_{m=1}^{M}|v_m|^2}{M\sigma^2}\right] \quad (14)$$

where, $v_m$, m=1, ... M, is the noiseless complex voltage observation at each antenna element. Since the actual DOA can be placed anywhere in the range $[-\pi,\pi)$, T=1000 different scenarios were considered, to give a consistent statistical validation. Compressive Sampling Matching Pursuit (CoSaMP) performs the CS operation. The performance parameter of the algorithm is characterized as Mean Square Error (MSE), where MSE is defined as, $$MSE = \frac{\sum_{a=1}^{T}|\bar{\theta}_{org,a} - \bar{\theta}_{est,a}|}{T} \quad (15)$$

where, $\bar{\theta}_{org,a}$ is the original DOA of the source and $\bar{\theta}_{est,a}$ is the estimated DOA using the algorithm.

The MSE of the proposed algorithm is compared with the Cramer-Rao Lower Bound (CRB or CRLB), as $$CRLB \geq \frac{-1}{\left(-\frac{2}{\sigma^2}\right)\left(M\frac{b^2r^2}{2}\right)} = \frac{\sigma^2}{Mb^2r^2} \quad (16)$$

Figure 5:
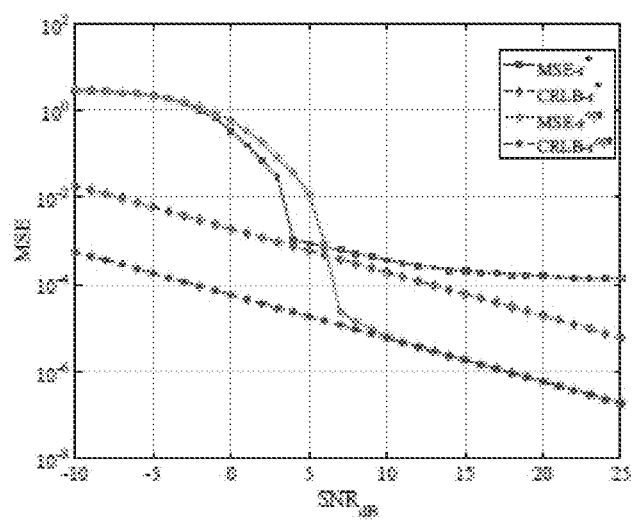
FIG. 5 illustrates a line plot of the impact of external noise in DOA estimations.

A set of results are presented in FIG. 5 to show the impact of external noise in estimating the original DOA of the source when an UCA is constructed with $r=r^*$ and $r=r^{opt}$ respectively (see FIG. 4). The results show that for a UCA geometry with $r^{opt}$, the algorithm under the simulation conditions achieves the CRB for $SNR_{dB}>10$ and remains on the bound for higher SNR. On the other hand, in case $r^*$, the graph approaches the bound for $SNR_{dB}=3$, but deviates away for higher SNR. The plot provides a clear indication that, UCA constructed with optimum radius ($r^{opt}$) is more efficient in detecting the DOA of a source with minimum error.

Figure 6:
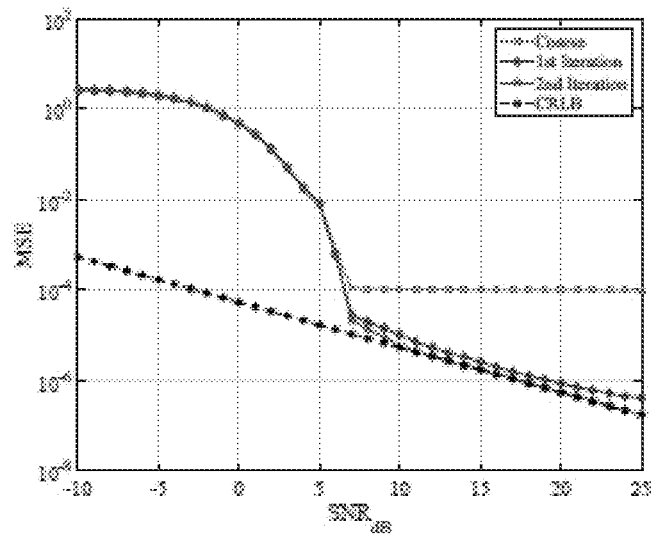
FIG. 6 illustrates a line plot of the convergence of the algorithm through a first DOA estimate and through two iterations. The Cramer-Rao Lower Bound (CRB) is also plotted.

Another set of simulations were carried out to examine convergence of the recursive algorithm in achieving the CRLB of DOA estimation. FIG. 6 shows plots that graphically display the convergence of the algorithm through a first estimate and through two iterations. The CRB is also plotted.

For SNR of 5 dB or less, the estimates have the same mean square error angle. Above 5 dB the first (course) estimate remains constant at a MSE about $10^{-4}$ whereas the first and second iterations perform closer to the CRB, the second iteration converging on the bound for about SNR>10.

COSAMP has a complexity of O(MN) in determining the solution of a sparse vector. The proposed method converges to the bound using just 2 iterations. Compared to Eigen-Value Decomposition (EVD) based DOA estimation such as (MUSIC and Root-MUSIC), the proposed algorithm therefore has much lower computational complexity.

Although the simulation was performed with N=180 for M=13, N may be increased or decreased. A reduction in N reduces computational complexity. For example, N may be reduced to approximately 100, or approximately 50, or approximately 40, or increased to approximately 250, 360 or more. In general, a minimum for N may be determined by the maintenance of sufficient sparsity for CS, which for some implementations may be between about two to three times M, whereas a maximum may be determined computational cost.

Figure 7:
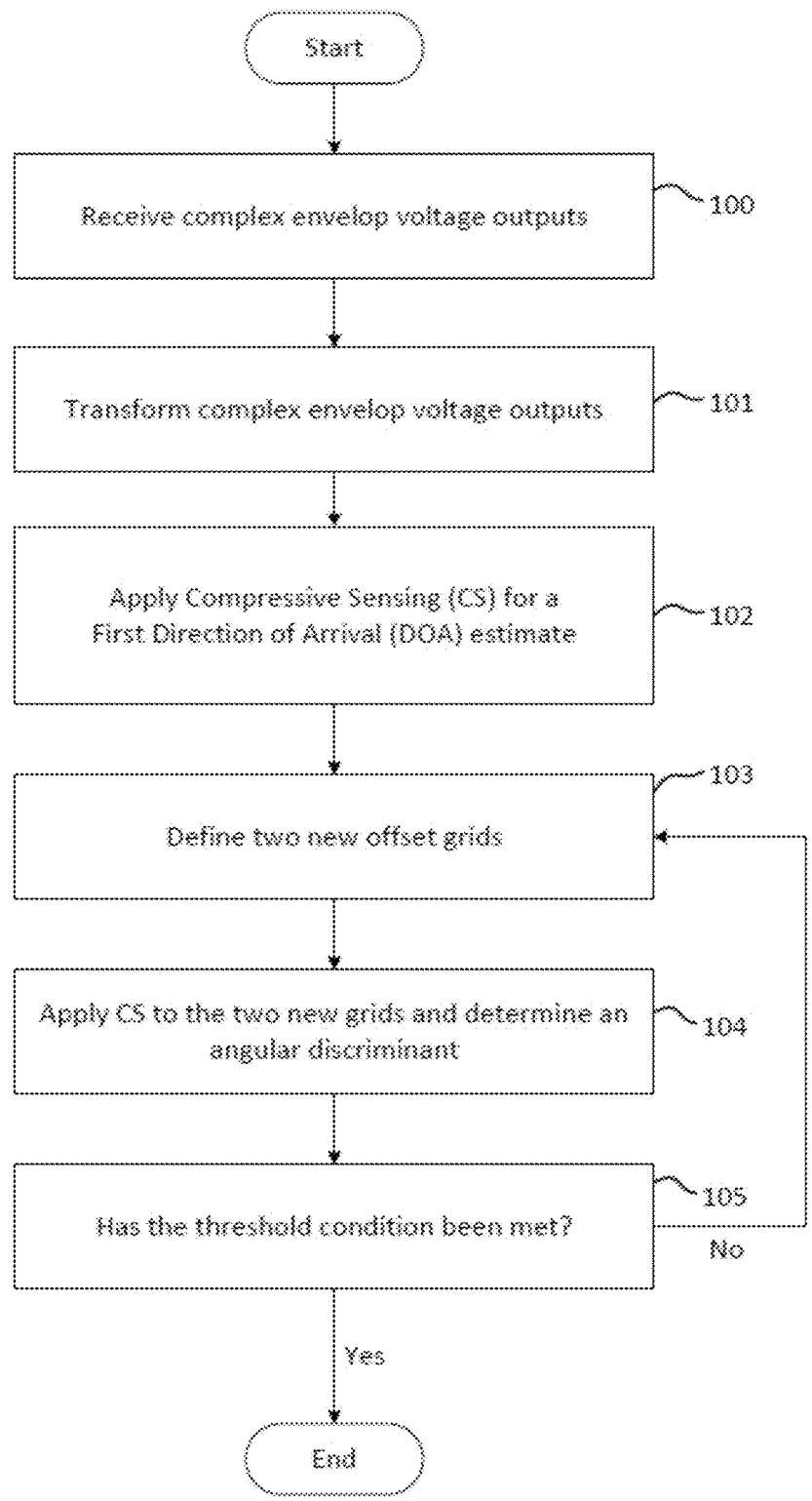
FIG. 7 shows a flow diagram of a process to perform DOA estimation.
Figure 8:
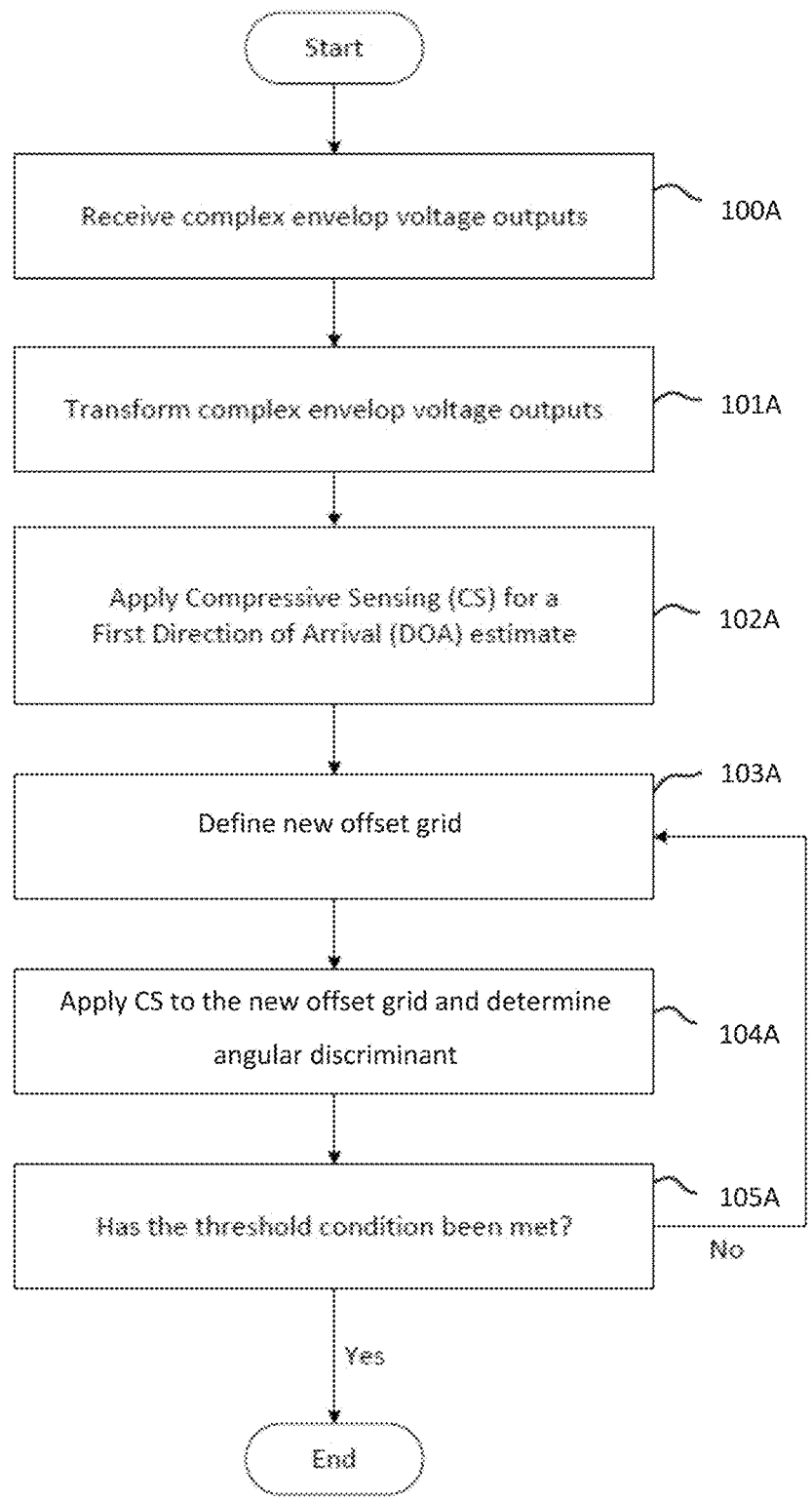
FIG. 8 shows a flow diagram of another process to perform DOA estimation.

FIGS. 7 and 8 show flow diagrams of embodiments of a process to perform DOA. The process may be performed, for example, by a computational processor configured with instructions, for example instructions held in non-volatile memory. In some embodiments the computational processor is in communication with an antenna array, for example a UCA as described herein above. In such embodiments DOA estimation may be performed substantially in real-time.

In steps 100, 100A a set of complex envelope voltage outputs are received from the antenna element array. These may be stored in transient or non-transient memory for further processing. In step 101, 101A the set of complex envelope voltage outputs are transformed by an orthogonal transform to increase sparsity. Step 101, 101A is omitted in other embodiments. In step 102, 102A CS is applied to the transformed outputs and a grid including a higher number of grid points than measured outputs, to reveal a first DOA estimate, specified by one of the grid points (the DOA grid point). In step 103, 103A two new grids or one new grid is defined, rotated with respect to the first grid. For example, the new grids include grid points that are rotated a half grid quantization interval. In step 104, 104A CS is applied to the new grid(s) and an angular discriminant is determined based on preceding CS solutions. In step 105, 105A a decision is made whether a threshold condition, for example based on the angular discriminant, has been met. If so, the process ends and the latest DOA estimate is used as the final DOA estimate. If not, the process returns to step 103, 103A.

Accordingly, the solutions of the CS operations yield the magnitudes derived from the two shifted sets of grid points, respectively. The magnitudes of the shifted grid points closest in angle to the previous direction of arrival estimate are used as the input to a phase error discriminant. The output of the phase error discriminate is then used to adjust the estimate of the angle of arrival. This process is continued in an iterative manner until the output of the phase error discriminant is below an acceptable, user-defined threshold. On each iteration, the estimate of the angle of arrival improves, until there is negligible discriminate output.

Figure 9:
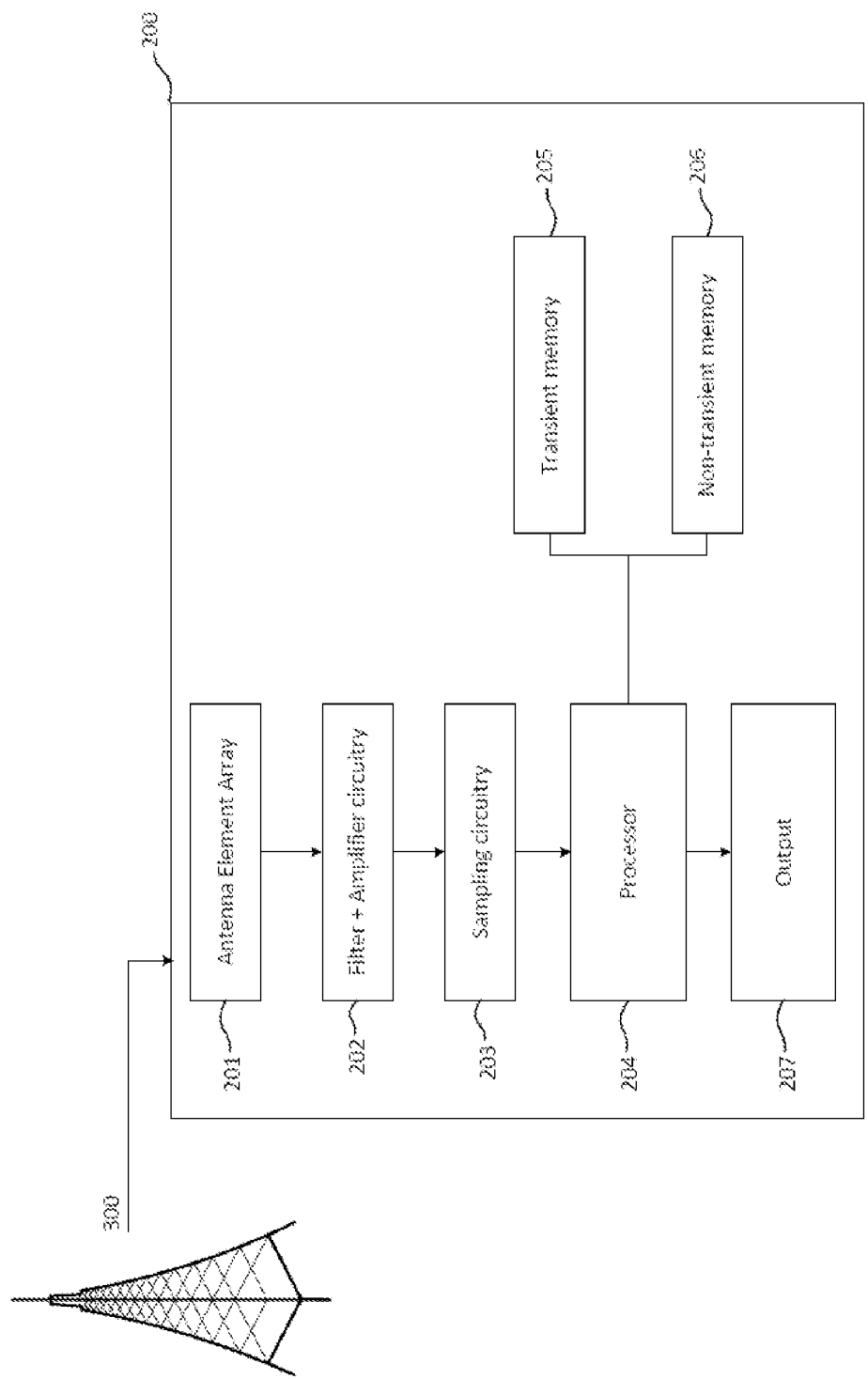
FIG. 9 shows a block diagram of a radio receiver for DOA estimation.

FIG. 9 shows a block diagram of a radio receiver 200 for DOA estimation. The radio receiver includes an antenna element array 201, filter and amplifier circuitry 202, sampling circuitry 203, which may include a local oscillator as a phase reference for the received signals, to sample the filtered and amplified signals from filter and amplifier circuitry 202 and a processor 204 for processing the signals, for example according to an embodiment described herein. The processes described herein above are suited for samples of a narrow-band signal. Where a DOA estimate is required for a wide-band signal, the filter and amplifier circuitry 202 includes a filter to compensate for phase shift in the received signal as a function of frequency. The processor 204 may hold the samples in transient memory 205 or process the signals according to instructions held in non-transient memory 206. The processor 204 provides the DOA estimate via an output 207, for example a display and/or a data communication interface to another device. The radio receiver 200 may receive a radio signal from a radio source 300, a plurality of radio signals from the radio source 300 and/or one or more radio signals from a plurality of radio sources 300 and determine DOA estimate(s) based on each of the received signals, or where appropriate based on a combined estimate for a plurality of signals.

Figure 10:
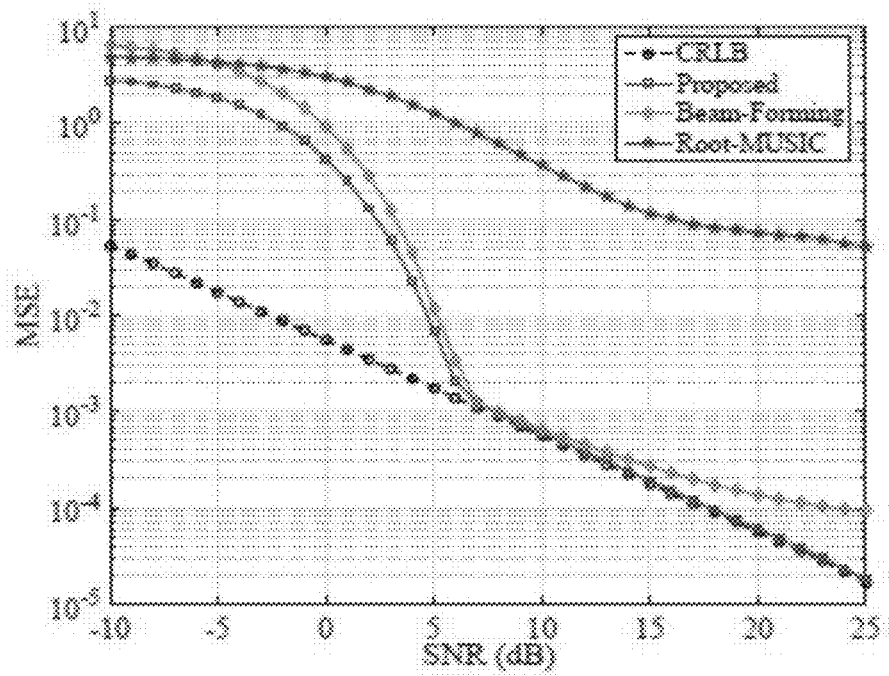
FIG. 10 shows an MSE performance comparison of an embodiment of the disclosed method using UCA as an antenna geometry against other DOA techniques, Root-MUSIC and Beam-Forming, for antenna geometry of a uniform circular array. The inter-element spacing is $$\frac{\lambda}{2}.$$
Figure 11:
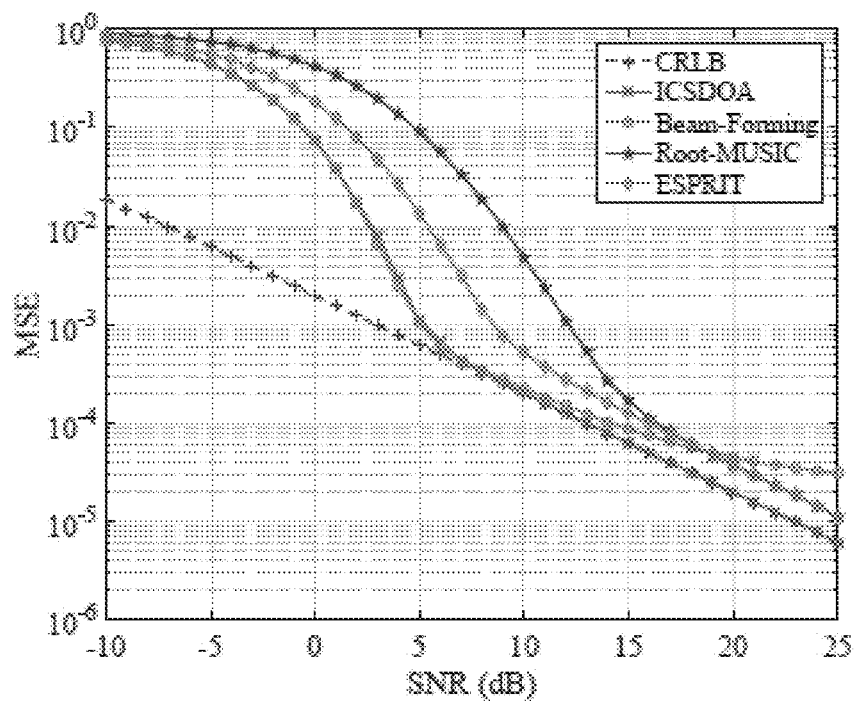
FIG. 11 shows an MSE performance comparison of an embodiment of the disclosed method using ULA as an antenna geometry against other DOA techniques, ESPRIT, Root-MUSIC and Beam-Forming, for antenna geometry of a uniform linear array. The inter-element spacing is $$\frac{\lambda}{2}.$$

FIGS. 10 and 11 show simulation results obtained for an embodiment of the disclosed methods. The simulations provide insight into the MSE performance of each of two example antenna array geometries under the influence of varying SNR. The MSEs of the estimation are compared to the theoretical CRLBs of the respective antenna geometries. The DOA of the incoming signal is determined for the disclosed embodiment (labelled "Proposed" in FIG. 10 and "ICSDOA" in FIG. 11). DOAs are randomly chosen, with an assumption that the DOAs are the in the range $[-\pi, \pi)$. The number of Monte Carlo runs for each DOAs is set to T=5000. Two antenna geometries are considered, where both UCA and ULA are constructed with M=9 antenna elements with an inter-element separation of $$d_{UCA} = d_{ULA} = \frac{\lambda}{2}.$$

The number of angular grid points for UCA and ULA is set to be $N_{UCA}=N_{ULA}=180$, with grid interval $$\omega_{UCA} = \frac{2\pi}{N_{UCA}} \text{ and } \omega_{ULA} = \frac{2\pi}{N_{ULA}}$$

respectively.

The CRLB for both UCA and ULA are shown. The CRLB of the ULA is lower than that of the UCA. The MSE plots for both the antenna geometries behave in a similar fashion, dipping off at an approximate SNR=6 dB and continuing to be on the CRLBs for higher SNR. For SNR<5 dB, the MSEs are relatively higher than the CRLBs with ULA having a lower MSE than UCA. The high MSE at low SNR regions can be associated with the inaccurate grid estimation of the disclosed algorithm, where the underlying CS operation fails to detect the angular grid on which the source is located.

Embodiments of the iterative compressive sensing direction of arrival estimation algorithm (ICSDOA) described above have significantly less computational complexity than previous algorithms that obtain estimates of the angle of arrival.

MUSIC is the Multiple Signal Classification Algorithm.

Root MUSIC is the Root Multiple Signal Classification Algorithm.

ESPIRIT is the Estimation Signal Parameter via a Rotation Invariant Technique.

Certain embodiments of the MUSIC Algorithm have computational complexity of $O(PM^2N+M^2)$, where P is the number of time samples (or snapshots) of the signals at the antenna outputs, M is the number of antennas in the array, N is the number of elements in the quantized grid Certain embodiments of the Root-MUSIC algorithm also have computational complexity $O(PM^2N+M^2)$.

Certain embodiments of the ESPIRIT Algorithm have computational complexity of $O(PM^2+M^3)$.

Certain embodiments of MUSIC, Root MUSIC, and ESPIRIT require P to be much greater than 1 for successful operation.

Certain embodiments of the ICSDOA iterative algorithm for the estimation of the angle of arrival has computational complexity of O(3MN), where O(3MN) is for compressive sensing and O(3MN) is for the evaluation of the dictionary matrix $\Phi$. An alternative implementation of the iterative algorithm has computational complexity of O(4MN).

The ICSDOA iterative algorithm has much less computational complexity than at least certain embodiments of MUSIC, Root Music, or ESPIRIT. The iterative algorithm obtains an estimate with only one time sample from the antenna elements. A sequence of output estimates may be further operated upon, if required, with signal processing to produce a reduced error estimate of the angle of arrival.

Further aspects and embodiments of the present disclosure will be apparent from the following description, given by of example to a radio signal. In other example the embodiments are applied to a sound signal. In other examples the embodiments are applied to a phase coherent light signal.

A method for use in a direction of arrival estimation for a radio signal, includes: receiving, at a computational processor, a set of measurements of a radio signal from a radio source taken by an array of antenna elements; generating first and second measures of a direction of arrival estimate, the generating based on first and second grids of potential direction of arrivals respectively, the first and second grids offset from each other; generating an angular discriminant based on the first and second measures; generating third and fourth measures of a direction of arrival estimate, the generating based on third and fourth grids of potential direction of arrivals respectively, the third and fourth grids offset from the first and second measures by an amount based on the angular discriminant.

A method for use in a direction of arrival estimation for a radio signal, includes: receiving, at a computational processor, a set of measurements of a radio signal from a radio source taken by an array of antenna elements; generating, by the computational processor based on the received measurements, a first measure associated with a first direction of arrival estimate for the radio signal, based on a first grid with a plurality of grid points corresponding to potential directions of arrival, the grid comprising a larger number of grid points than antenna elements in the array of antenna elements and a lower resolution of grid points than required to achieve a target accuracy for the direction of arrival estimation; generating, by the computational processor, a second measure associated with a second direction of arrival estimate for the radio signal, based on a second grid comprising grid points around the first direction of arrival estimate that are offset to grid points in the first grid; and determining, by the computational processor, an angular discriminant based on the first measure and the second measure, wherein the measures associated with the direction of arrival estimates are based on a solution to a sparse problem defined by the received set of measurements and the respective grid points.

In some embodiments the set of measurements comprise a single measurement value.

In some embodiments the set of measurements comprises measurements from a circular array. In some implementations the circular array is a uniform circular array.

In some embodiments the set of measurements comprises measurements corresponding to an odd number of antenna elements.

In some embodiments the set of measurements comprises at least 5 measurements, or between 7 and 25 measurements, or between 9 and 23 measurements, or between 9 and 21 measurements, or between 9 and 19 measurements, or between 9 and 17 measurements, or between 9 and 15 measurements.

An antenna array for direction of arrival estimation includes a plurality of antenna elements arranged in a substantially uniform array, each antenna element configured to provide a measurement signal of a radio signal having a base wavelength, wherein a distance between pairs of antenna elements is substantially equal to a distance that minimises at least one of or a combined measure of a mutual coherence and a condition number of a matrix of said measurement signals of a radio signal by the antenna array at the base wavelength.

An antenna array for direction of arrival estimation includes a plurality of antenna elements arranged in a substantially uniform array, each antenna element configured to provide a measurement signal of a radio signal having a base wavelength, wherein a distance between pairs of antenna elements is greater than a distance corresponding to one wavelength at the base wavelength.

In some embodiments the distance between pairs of antenna elements in the antenna array is greater than a distance corresponding to two wavelengths at the base wavelength.

In some embodiments the distance between pairs of antenna element in the array is one half wavelength.

In some embodiment the distance between pairs of antenna elements is less than one wavelength.

In some embodiment the distance between pairs of antenna elements is less than one half wavelength.

In some embodiments the distance between pairs of antenna elements in the antenna array is less than a distance corresponding to ten wavelengths at the base wavelength. In some implementations the distance between pairs of antenna elements is about a distance corresponding to six wavelengths at the base wavelength.

In some embodiments the array comprises an odd number of antenna elements.

In some embodiments the number of antenna elements is at least 5 or at least 7 or at least 9.

In some embodiments the number of antenna elements less than or equal to 15. In other embodiments the number of antenna elements is more than 15.

In some embodiments the antenna array is substantially a uniform circular array.

In some embodiments the antenna array is substantially a uniform linear array.

In some embodiment the antenna array is of a geometry that is neither a uniform linear array nor a uniform circular array.

A radio receiver for direction of arrival estimation includes: an antenna array according to any embodiment described in the preceding paragraphs; and a computational processor configured to receive measurement signals for a radio signal from the antenna array and generate a direction of arrival estimation based on the measurement signals, the direction of arrival estimation utilising compressive sensing.

In some embodiments of the radio receiver, the computational processor is configured to perform the method as described in the preceding paragraphs.

The radio receiver of claim 17 or claim 18, configured to provide a direction of arrival estimate anywhere within the range 0 to $2\pi$.

A method of direction of arrival estimation for a radio signal includes: receiving, at a computational processor, a set of measurements of a radio signal from a radio source taken by an array of antenna elements; generating, by the computational processor based on the received measurements, a direction of arrival estimate for the radio signal, wherein the direction of arrival estimate is based on compressive sensing of a sparse problem defined by a de-correlating transform of the received set of measurements and a grid with a plurality of grid points corresponding to potential directions of arrival, the grid comprising a larger number of grid points than antenna elements in the array of antenna elements.

In some embodiments the set of measurements of a radio signal from a radio source taken by an array of antenna elements, is a set of measurements from a circular array, which may be a uniform circular array.

In some embodiments the set of measurements consists of measurements corresponding to an odd number of antenna elements, for example between 5, 7 or 9 elements and 15 elements.

A method of direction of arrival estimation for a radio signal includes generating, by a computational processor based on received measurements of a radio signal from an antenna element array, a direction of arrival estimate for the radio signal from within a possible range of 0 to $2\pi$, wherein the direction of arrival estimate is based on compressive sensing of a sparse problem defined by the received set of measurements and a grid with a plurality of grid points corresponding to potential directions of arrival, the grid comprising a larger number of grid points than antenna elements in the array of antenna elements.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A method for estimating a direction of arrival of a signal, comprising:
   receiving, at a processor, a set of measurements of the signal from an antenna element array comprising a plurality of spatially separated antenna elements, wherein the set of measurements of the signal comprises a set of complex envelope voltage outputs; and
   in an iterative process:
   applying, by the processor, a computational technique for solving an under-determined set of linear equations to the set of complex envelope voltage outputs and a plurality of grids of candidate directions of arrival to generate a plurality of solutions, the plurality of solutions indicating a first interim direction of arrival estimate in relation to a first grid of the plurality of grids of candidate directions of arrival and a second interim direction of arrival estimate in relation to a second grid of the plurality of grids of candidate directions of arrival, wherein the first grid and the second grid include a number of grid points that is higher than the set of complex envelope voltage outputs and are rotated relative to each other;
   generating, by the processor, a first angular discriminant based on the first interim direction of arrival estimate and the second interim direction of arrival estimate; and
   generating, by the processor, a direction of arrival estimation between the first interim direction of arrival estimate and the second interim direction of arrival estimate based on the first angular discriminant.

2. The method of claim 1, wherein the plurality of grids of candidate directions of arrival includes a third grid, rotated relative to the first grid and the second grid and wherein the plurality of solutions indicates a third interim direction of arrival estimate, and wherein the method includes, prior to generating the first angular discriminant:
   generating a second angular discriminant based on the third interim direction of arrival estimate and the first interim direction of arrival estimate; and
   determining that the second angular discriminant does not satisfy a threshold condition, wherein generating the first angular discriminant is responsive to the determination that the second angular discriminant does not satisfy the threshold condition.

3. The method of claim 2, wherein the first grid and the second grid are rotated relative to each other by an amount determined, by the processor, based on the second angular discriminant.

4. The method of claim 1, wherein the plurality of grids of candidate directions of arrival comprise at least three grids of candidate directions of arrival and wherein the method includes iteratively applying, by the processor, the computational technique to the set of complex envelope voltage outputs and pairs of candidate directions of arrival to generate solutions and generating an angular discriminant for each pair of candidate directions of arrival until the generated angular discriminant satisfies a threshold condition, wherein the first angular discriminant satisfies the threshold condition.

5. The method of claim 1, wherein the first angular discriminant is based on relative magnitudes of the solutions indicating the first interim direction of arrival estimate and the second interim direction of arrival estimate.

6. The method of claim 1, further comprising producing a null in a received antenna pattern, wherein the null is located in the received antenna pattern based on the generated direction of arrival estimation.

7. The method of claim 1, further comprising determining, based on the generated direction of arrival estimation, that a transmission associated with the set of complex envelope voltage outputs is from an authorized user.

8. The method of claim 1, further comprising determining, based on the generated direction of arrival estimation, that a transmission associated with the set of complex envelope voltage outputs is from an unauthorized user.

9. The method of claim 1, wherein the plurality of spatially separated antenna elements includes a plurality of antenna elements spatially separated across two orthogonal dimensions and wherein the generated direction of arrival estimation is a first dimensional estimation, in relation to one of the two orthogonal dimensions.

10. The method of claim 9, further including repeating the method for the other of the two orthogonal dimensions to generate a second dimensional estimation.

11. The method of claim 10, further comprising generating a three-dimensional direction of arrival estimation based on the first dimensional estimation and the second dimensional estimation.

12. The method of claim 11, wherein the first dimensional estimation is an estimation of azimuth and wherein the second dimensional estimation is an estimation of elevation.

13. A method for estimating a direction of arrival of a signal comprising:
   receiving, at a processor, input signals, wherein the input signals comprise a set of measurements of one or more signals that is representative of detection of the one or more signals received at a respective plurality of spatially separated sensor elements;
   in an initial determination and in at least a first iteration determining, by the processor, based on phase information in the input signals and a known geometry of the respective plurality of spatially separated sensor elements, at least one sparse solution indicating one or more estimated directions of arrival amongst a set of candidate directions of arrival, wherein for each iteration the set of candidate directions of arrival are rotated, and wherein each iteration is performed based on preceding sparse solutions to cause the at least the first iteration to display convergence in the at least one sparse solution; and
   determining by the processor, based on the preceding sparse solutions, that a convergence threshold for the at least one sparse solution has been satisfied and in response generating data indicating a direction of arrival estimation for the signal based on the preceding sparse solutions.

14. The method of claim 13, further comprising determining that the convergence threshold for the at least one sparse solution has been satisfied based on relative magnitudes of the preceding sparse solutions.

15. The method of claim 13, wherein the respective plurality of spatially separated sensor elements comprise an array of antenna elements of an antenna and the method further comprises producing a null in a receive antenna pattern of the antenna, wherein the null is located in the received antenna pattern based on the generated direction of arrival estimation.

16. The method of claim 13, further comprising determining, based on the generated direction of arrival estimation, that a transmission associated with the set of complex envelope voltage outputs is either from an authorized user or from an unauthorized user.

17. The method of claim 13, wherein the respective plurality of spatially separated sensor elements is a first set of sensor elements and the direction of arrival estimation is in relation to azimuth or elevation and comprising repeating the method for a second set of spatially separated sensor elements to generate another direction of arrival estimation in relation to elevation or azimuth respectively.

18. An iterative method for direction of arrival estimation of a signal at a receiver with a plurality of spatially separated sensor elements, the method comprising:

generating a first quantized estimate of an angle of arrival from a compressive sensing solution of a set of equations relating sensor output signals from the plurality of spatially separated sensor elements to direction of arrival, wherein the set of equations relates a set of measurements of the sensor output signals; and refining the first quantized estimate in at least one subsequent iteration by a computed error based a quantized estimate of the direction of arrival in relation to quantization points offset from the quantization points for the first quantized estimate of the angle of arrival, wherein the offset is selected to cause the at least one subsequent iteration to converge on an estimated direction of arrival.

19. The method of claim 18, wherein the plurality of spatially separated sensor elements comprise an array of antenna elements of an antenna, and the method further comprises producing a null in a receive antenna pattern of the antenna, wherein the null is located in the received antenna pattern based on the estimated direction of arrival.

20. The method of claim 18, further comprising determining, based on the estimated direction of arrival, that a transmission associated with the set of complex envelope voltage outputs is either from an authorized user or from an unauthorized user.

* * * * *